(12) United States Patent
Takayama

(10) Patent No.: US 11,685,466 B2
(45) Date of Patent: Jun. 27, 2023

(54) HUMAN-POWERED VEHICLE CONTROL DEVICE

(71) Applicant: SHIMANO Inc., Sakai (JP)

(72) Inventor: Hitoshi Takayama, Sakai (JP)

(73) Assignee: Shimano Inc., Sakai (JP)

( * ) Notice: Subject to any disclaimer, the term of this patent is extended or adjusted under 35 U.S.C. 154(b) by 922 days.

(21) Appl. No.: 16/564,468

(22) Filed: Sep. 9, 2019

(65) Prior Publication Data

US 2020/0079467 A1 Mar. 12, 2020

(30) Foreign Application Priority Data

Sep. 10, 2018 (JP) .................................. 2018-168611

(51) Int. Cl.
| | | |
|---|---|---|
| *B62M 6/45* | (2010.01) | |
| *B62M 1/36* | (2013.01) | |
| *B62J 99/00* | (2020.01) | |
| *B62M 25/08* | (2006.01) | |
| *B62J 45/20* | (2020.01) | |

(52) U.S. Cl.
CPC ................ *B62M 6/45* (2013.01); *B62J 99/00* (2013.01); *B62M 1/36* (2013.01); *B62M 25/08* (2013.01); *B62J 45/20* (2020.02)

(58) Field of Classification Search
CPC .......... B62M 6/45; B62M 1/36; B62M 25/08; B62M 25/00; B62M 6/50; B62J 99/00; B62J 45/20; B62J 2001/085; B62K 23/00; B62L 3/00

See application file for complete search history.

(56) References Cited

U.S. PATENT DOCUMENTS

| | | | | |
|---|---|---|---|---|
| 5,915,493 | A | * 6/1999 | Nakayama | .............. B60L 50/20 180/220 |
| 2012/0228906 | A1 | * 9/2012 | McAndrews | ......... F16B 7/1409 74/493 |
| 2013/0334874 | A1 | * 12/2013 | Shirai | .................... B62M 25/08 307/9.1 |
| 2017/0341705 | A1 | * 11/2017 | Tsuchizawa | ............. B62M 6/55 |
| 2018/0229803 | A1 | * 8/2018 | Wesling | .............. H01M 50/296 |

FOREIGN PATENT DOCUMENTS

| | | |
|---|---|---|
| CN | 103723223 A | 4/2014 |
| CN | 105398538 A | 3/2016 |
| CN | 106476973 A | 3/2017 |
| CN | 107406120 A | 11/2017 |
| JP | H1059260 A | 3/1998 |
| JP | 2017186016 A | 10/2017 |
| TW | 201741179 A | 12/2017 |

* cited by examiner

*Primary Examiner* — Richard M Camby
(74) *Attorney, Agent, or Firm* — Alleman Hall Creasman & Tuttle LLP

(57) ABSTRACT

A human-powered vehicle control device includes a controller configured to control a motor that assists propulsion of a human-powered vehicle including a movable member that is extensible and retractable. The controller controls the motor in accordance with actuation of the movable member during an extending or retracting action of the movable member.

17 Claims, 10 Drawing Sheets

HUMAN-POWERED VEHICLE CONTROL DEVICE

BACKGROUND ART

The present disclosure relates to a human-powered vehicle control device.

Patent Document 1 discloses a human-powered vehicle control device that controls a motor so that a ratio of motor output to human driving force input to a human-powered vehicle becomes equal to a predetermined ratio.

Patent Document 1: Japanese Laid-Open Patent Publication No. 10-59260

SUMMARY

One object of the present disclosure is to provide a human-powered vehicle control device that controls a motor in a preferred manner.

A human-powered vehicle control device in accordance with a first aspect of the present disclosure comprises a controller configured to control a motor that assists propulsion of a human-powered vehicle including a movable member that is extensible and retractable. The controller controls the motor in accordance with actuation of the movable member during an extending or retracting action of the movable member.

The human-powered vehicle control device in accordance with the first aspect controls the motor in a preferred manner in accordance with the extending or retracting action of the movable member.

In accordance with a second aspect of the present disclosure, the human-powered vehicle control device according to the first aspect is configured so that the controller is configured to control the motor in accordance with at least one of an actuating direction and an actuating speed of the movable member.

The human-powered vehicle control device in accordance with second aspect controls the motor in a preferred manner in accordance with at least one of the actuating direction and the actuating speed of the movable member.

In accordance with a third aspect of the present disclosure, the human-powered vehicle control device according to the first or second aspect is configured so that the movable member is an adjustable seatpost that includes an outer member and an inner member. The controller increases an assist ratio of the motor to human driving force input to the human-powered vehicle in a case where the adjustable seatpost is actuated to move the outer member and the inner member away from each other.

With the human-powered vehicle control device in accordance with the third aspect, the assist ratio of the motor can be increased in a case where the adjustable seatpost is actuated to move the outer member and the inner member away from each other.

In accordance with a fourth aspect of the present disclosure, the human-powered vehicle control device according to the third aspect is configured so that the controller decreases the assist ratio of the motor in a case where the adjustable seatpost is actuated to move the outer member and the inner member toward each other.

With the human-powered vehicle control device in accordance with the fourth aspect, the assist ratio of the motor can be decreased in a case where the adjustable seatpost is actuated to move the outer member and the inner member toward each other.

In accordance with a fifth aspect of the present disclosure, the human-powered vehicle control device according to the first or second aspect is configured so that the movable member is an adjustable seatpost that includes an outer member and an inner member. The controller decreases an assist ratio of the motor to human driving force input to the human-powered vehicle in a case where the adjustable seatpost is actuated to move the outer member and the inner member toward each other.

With the human-powered vehicle control device in accordance with the fifth aspect, the assist ratio of the motor can be decreased in a case where the adjustable seatpost is actuated to move the outer member and the inner member toward each other.

In accordance with a sixth aspect of the present disclosure, the human-powered vehicle control device according to the first or second aspect is configured so that the movable member is an adjustable seatpost that includes an outer member and an inner member. The controller starts driving the motor in a case where human driving force input to the human-powered vehicle becomes equal to a predetermined threshold value. Further, the controller decreases the predetermined threshold value in a case where the adjustable seatpost is actuated to move the outer member and the inner member away from each other.

With the human-powered vehicle control device in accordance with the sixth aspect, the predetermined threshold value can be decreased in a case where the adjustable seatpost is actuated to move the outer member and the inner member away from each other. Thus, the motor can be started driving promptly in a case where the adjustable seatpost is actuated to move the outer member and the inner member away from each other.

In accordance with a seventh aspect of the present disclosure, the human-powered vehicle control device according to the sixth aspect is configured so that the controller increases the predetermined threshold value in a case where the adjustable seatpost is actuated to move the outer member and the inner member toward each other.

With the human-powered vehicle control device in accordance with the seventh aspect, the predetermined threshold value can be increased in a case where the adjustable seatpost is actuated to move the outer member and the inner member toward each other. Thus, the initiation of the driving of the motor can be delayed in a case where the adjustable seatpost is actuated to move the outer member and the inner member toward each other.

In accordance with an eighth aspect of the present disclosure, the human-powered vehicle control device according to the first or second aspect is configured so that the movable member is an adjustable seatpost that includes an outer member and an inner member. The controller starts driving the motor in a case where human driving force input to the human-powered vehicle becomes equal to a predetermined threshold value. Further, the controller increases the predetermined threshold value in a case where the adjustable seatpost is actuated to move the outer member and the inner member toward each other.

With the human-powered vehicle control device in accordance with the eighth aspect, the predetermined threshold value can be increased in a case where the adjustable seatpost is actuated to move the outer member and the inner member toward each other. The initiation of the driving of the motor can be delayed in a case where the adjustable seatpost is actuated to move the outer member and the inner member toward each other.

In accordance with a ninth aspect of the present disclosure, the human-powered vehicle control device according to the first or second aspect is configured so that the movable member is an adjustable seatpost that includes an outer member and an inner member. The controller controls the motor so that a response speed of the motor becomes equal to a first response speed in a case where a moving speed of the inner member relative to the outer member is greater than or equal to a predetermined speed. Further, the controller controls the motor so that the response speed of the motor becomes equal to a second response speed in a case where the moving speed of the inner member relative to the outer member is less than the predetermined speed. The first response speed is lower than the second response speed.

With the human-powered vehicle control device in accordance with the ninth aspect, the response speed of the motor in a case the moving speed of the inner member relative to the outer member is greater than or equal to the predetermined speed can be lower than a case where the moving speed of the inner member relative to the outer member is less than the predetermined speed.

In accordance with a tenth aspect of the present disclosure, the human-powered vehicle control device according to the second aspect is configured so that the movable member is an adjustable seatpost that includes an outer member and an inner member. The controller changes an assist ratio of the motor to human driving force input to the human-powered vehicle in accordance with a moving direction of the inner member relative to the outer member. Further, the controller changes a response speed of the motor in accordance with a moving speed of the inner member relative to the outer member.

With the human-powered vehicle control device in accordance with the tenth aspect, the assist ratio of the motor can be changed to a preferred ratio in accordance with the moving direction of the inner member relative to the outer member. Further, the response speed of the motor can be changed to a preferred speed in accordance with the moving speed of the inner member relative to the outer member.

In accordance with an eleventh aspect of the present disclosure, the human-powered vehicle control device according to the second aspect is configured so that the movable member is an adjustable seatpost that includes an outer member and an inner member. The controller starts driving the motor in a case where human driving force input to the human-powered vehicle becomes equal to a predetermined threshold value. Further, the controller changes the predetermined threshold value in accordance with a moving direction of the inner member relative to the outer member. Moreover, the controller changes a response speed of the motor in accordance with a moving speed of the inner member relative to the outer member.

With the human-powered vehicle control device in accordance with the eleventh aspect, the predetermined threshold value can be changed to a preferred value in accordance with the moving direction of the inner member relative to the outer member. Further, the response speed of the motor can be changed to a preferred speed in accordance with the moving speed of the inner member relative to the outer member.

In accordance with a twelfth aspect of the present disclosure, the human-powered vehicle control device according to the first or second aspect is configured so that the movable member is an adjustable seatpost that includes an outer member and an inner member. The controller controls the motor at a first assist ratio in a case where a moving speed of the inner member relative to the outer member is greater than or equal to a first predetermined speed. Further, the controller controls the motor at a second assist ratio in a case where the moving speed of the inner member relative to the outer member is less than the first predetermined speed. The first assist ratio is lower than the second assist ratio.

With the human-powered vehicle control device in accordance with the twelfth aspect, the assist ratio can be smaller in a case where the moving speed of the inner member relative to the outer member is greater than or equal to the first predetermined speed than in a case where the moving speed is less than the first predetermined speed.

In accordance with a thirteenth aspect of the present disclosure, the human-powered vehicle control device according to the first or second aspect is configured so that the movable member is an adjustable seatpost that includes an outer member and an inner member. The controller controls the motor at a third assist ratio in a case where a moving speed of the inner member relative to the outer member is greater than or equal to a second predetermined speed. Further, the controller controls the motor at a fourth assist ratio in a case where a moving speed of the inner member relative to the outer member is less than the second predetermined speed. The third assist ratio is higher than the fourth assist ratio.

With the human-powered vehicle control device in accordance with the thirteenth aspect, the assist ratio can be greater in a case where the moving speed of the inner member relative to the outer member is greater than or equal to the second predetermined speed than in a case where the moving speed is less than the second predetermined speed.

In accordance with a fourteenth aspect of the present disclosure, the human-powered vehicle control device according to the first or second aspect is configured so that the human-powered vehicle includes a wheel and a crank, and the movable member is an adjustable seatpost. The controller controls a transmission that changes a transmission ratio of a rotational speed of the crank to a rotational speed of the wheel in accordance with a traveling state of the human-powered vehicle. Further, the controller changes a transmission threshold value of the transmission ratio in accordance with the actuation of the adjustable seatpost.

With the human-powered vehicle control device in accordance with the fourteenth aspect, the transmission can be controlled in a preferred manner in accordance with at least one of the actuating direction and the actuating speed of the adjustable seatpost.

In accordance with a fifteenth aspect of the present disclosure, the human-powered vehicle control device according to the first or second aspect is configured so that the movable member is an adjustable seatpost that includes an outer member and an inner member. The controller starts driving the motor in a case where human driving force input to the human-powered vehicle becomes equal to a predetermined threshold value. Further, the controller increases the predetermined threshold value in a case where a moving speed of the inner member relative to the outer member is greater than or equal to a third predetermined speed.

With the human-powered vehicle control device in accordance with the fifteenth aspect, the predetermined threshold value can be increased in a case where the moving speed of the inner member relative to the outer member is greater than or equal to the third predetermined speed. Thus, the initiation of the driving of the motor can be delayed in a case where the moving speed of the inner member relative to the outer member is greater than or equal to the third predetermined speed.

In accordance with a sixteenth aspect of the present disclosure, the human-powered vehicle control device according to the fifteenth aspect is configured so that the controller decreases the predetermined threshold value in a case where the moving speed of the inner member relative to the outer member is less than the third predetermined speed.

With the human-powered vehicle control device in accordance with the sixteenth aspect, the predetermined threshold value can be decreased in a case where the moving speed of the inner member relative to the outer member is less than the third predetermined speed. Thus, the motor can be started driving promptly in a case where the moving speed of the inner member relative to the outer member is less than the third predetermined speed.

A human-powered vehicle control device in accordance with a seventeenth aspect of the present disclosure comprises a controller configured to control a motor that assists propulsion of a human-powered vehicle having an operation device including a movable member. The controller is configured to control the motor in accordance with at least one of an actuating speed and an actuating direction of the movable member.

The human-powered vehicle control device in accordance with the seventeenth aspect controls the motor in a preferred manner in accordance with the actuating speed of the movable member.

In accordance with an eighteenth aspect of the present disclosure, the human-powered vehicle control device according to the seventeenth aspect is configured so that the operation device includes at least one of a lever-type operation device and a grip-type operation device.

The human-powered vehicle control device in accordance with the eighteenth aspect can control the motor in a preferred manner in accordance with the actuating speed of the movable member that includes the lever-type or grip-type operation device.

The human-powered vehicle control device of the present disclosure controls the motor in a preferred manner.

DETAILED DESCRIPTION

First Embodiment

Figure 1:
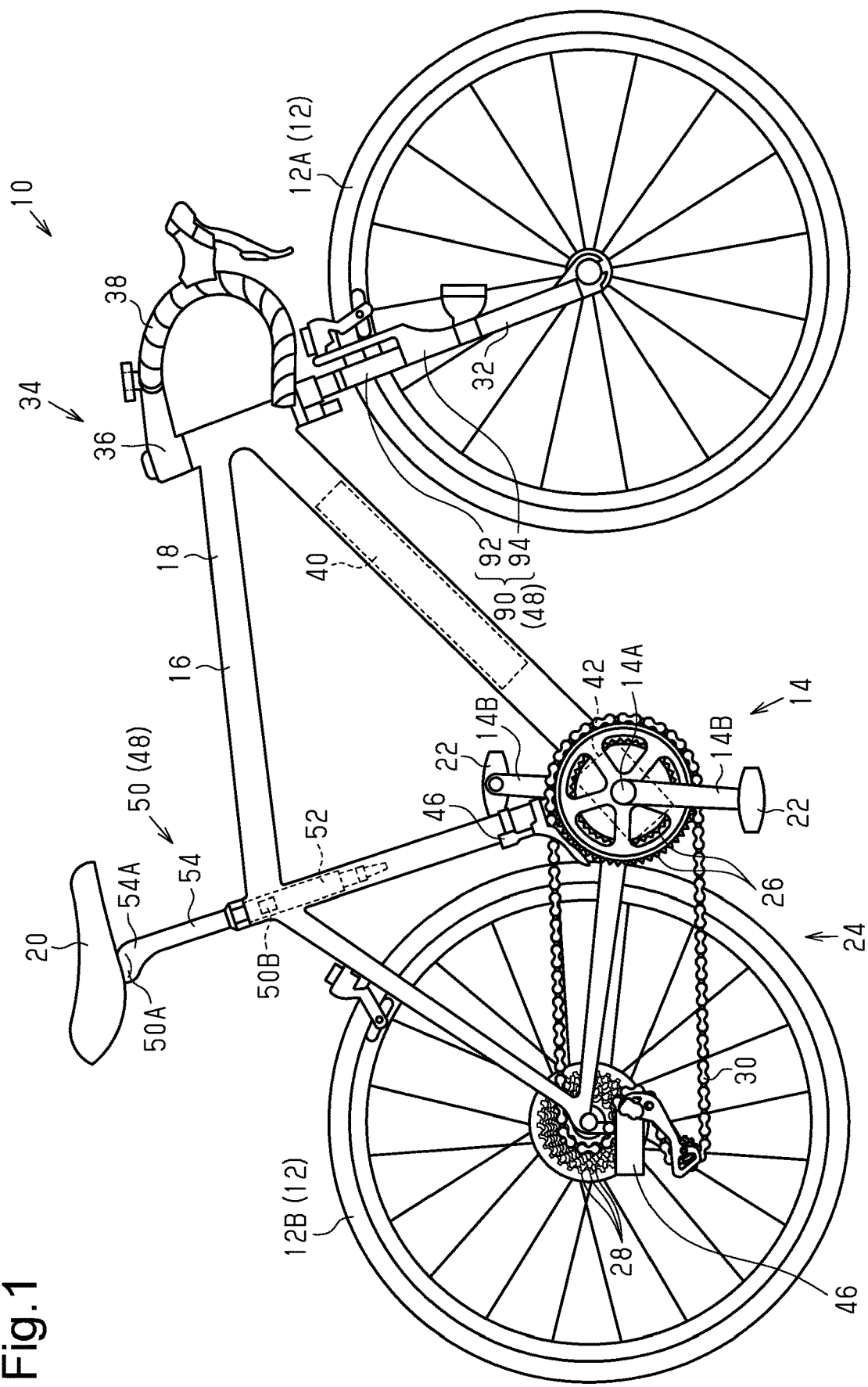
FIG. 1 is a side view of a human-powered vehicle including a human-powered vehicle control device in accordance with a first embodiment.

A human-powered vehicle control device 60 in accordance with the first embodiment will now be described with reference to FIGS. 1 to 3. Hereinafter, the human-powered vehicle control device 60 will be simply referred to as the control device 60. The control device 60 is provided on a human-powered vehicle 10. The human-powered vehicle 10 is a vehicle that can be driven by at least human driving force H. There is no limit to the number of wheels of the human-powered vehicle 10. For example, the human-powered vehicle 10 can be a unicycle or a vehicle having three or more wheels. Examples of the human-powered vehicle 10 include various types of bicycles such as a mountain bike, a road bike, a city bike, a cargo bike, and a recumbent bicycle. The bicycle includes an electric bicycle (E-bike) that produces driving force with an electric motor. The electric bicycle includes an electric assist bicycle that assists propulsion of the vehicle with an electric motor. In the embodiments described hereafter, the human-powered vehicle 10 will be referred to as a bicycle having two wheels.

The human-powered vehicle 10 includes a crank 14, a wheel 12, and a vehicle body 16. The vehicle body 16 includes a frame 18 and a saddle 20. The human driving force H is input to the crank 14. The crank 14 includes a crankshaft 14A and two crank arms 14B. The crankshaft 14A is rotatably supported by the frame 18. The two crank arms 14B are provided on two ends of the crankshaft 14A, respectively. A pedal 22 is connected to each crank arm 14B. The wheel 12 includes a driven wheel 12A and a driving wheel 12B. The driving wheel 12B is driven by the rotation of the crank 14. The driving wheel 12B is supported by the frame 18. The crank 14 is connected to the driving wheel 12B by a driving mechanism 24. The driving mechanism 24 includes a first rotary body 26 coupled to the crankshaft 14A. The crankshaft 14A and the first rotary body 26 can be coupled integrally rotatable, or can be coupled by a first one-way clutch. The first one-way clutch is configured to rotate the first rotary body 26 forward in a case where the crank 14 is rotated forward and is configured not to rotate the first rotary body 26 rearward in a case where the crank 14 is rotated rearward. The first rotary body 26 includes a sprocket, a pulley or a bevel gear. The driving mechanism 24 further includes a second rotary body 28 and a linking member 30. The linking member 30 transmits rotational force of the first rotary body 26 to the second rotary body 28. The linking member 30 includes, for example, a chain, a belt, or a shaft.

The second rotary body 28 is connected to the driving wheel 12B. The second rotary body 28 includes a sprocket, a pulley, or a bevel gear. A second one-way clutch is preferably provided between the second rotary body 28 and the driving wheel 12B. The second one-way clutch is configured to rotate the driving wheel 12B forward in a case where the second rotary body 28 is rotate forward and is configured not to rotate the driving wheel 12B rearward in a case where the second rotary body 28 is rotated rearward. The human-powered vehicle 10 can include a transmission 46 used for changing a transmission ratio B of a rotational speed of the driving wheel 12B to a rotational speed of the crankshaft 14A. The transmission 46 includes, for example, at least one of a front derailleur, a rear derailleur, and an internal shifting device. The transmission 46 can include only a front derailleur, only a rear derailleur, or only an internal shifting device, or any combination of the front derailleur, the rear derailleur, and the internal shifting device. In the present embodiment, at least one of the first rotary body 26 and the second rotary body 28 includes a plurality of sprockets. Only the first rotary body 26, only the second rotary body 28, or both the first rotary body 26 and the second rotary body 28 can include a plurality of sprockets. In the present embodiment, the first rotary body 26 includes one sheet of sprocket, and the second rotary body 28 includes multiple sprockets. In a case where the first rotary body 26 includes multiple front sprockets, the derailleur includes a front derailleur. In a case where the second rotary body 28 includes a plurality of front sprockets, the derailleur includes a rear derailleur. In a case where the transmission 46 includes an internal shifting device, the internal shifting device is provided, for example, on a hub of the driving wheel 12B.

The human-powered vehicle 10 includes a front wheel and a rear wheel. The front wheel is coupled to the frame 18 by a front fork 32. A handlebar portion 34 is connected to the front fork 32. The handlebar portion 34 includes a stem 36 and a handlebar 38. The handlebar 38 is connected to the front fork 32 by the stem 36. In the following embodiments, the rear wheel will be referred to as the driving wheel 12B. However, the front wheel can be the driving wheel 12B.

The human-powered vehicle 10 further includes a battery 40. The battery 40 includes one or more battery cells. Each battery cell includes a rechargeable battery. The battery 40 is provided on the human-powered vehicle 10 and supplies electric power to other electric components that are electrically connected to the battery 40 such as the human-powered vehicle control device 60. The battery 40 is connected to the human-powered vehicle control device 60 through wired connection or wireless connection in a manner allowing for communication. The battery 40 is configured to communicate with the human-powered vehicle control device 60 through, for example, power line communication (PLC). The battery 40 can be attached on the outside of the frame 18 or at least partially accommodated inside the frame 18.

The human-powered vehicle 10 includes a motor 42 configured to assist propulsion of the human-powered vehicle 10. The human-powered vehicle 10 further includes a drive circuit 44. The drive circuit 44 includes an inverter circuit. The motor 42 is preferably provided on the same housing as the drive circuit 44. The drive circuit 44 controls the electric power supplied from the battery 40 to the motor 42. The drive circuit 44 is connected to the human-powered vehicle control device 60 through wired connection or wireless connection in a manner allowing for communication. The drive circuit 44 is configured to communicate with a controller 62 of the human-powered vehicle control device 60, for example, through serial communication. The drive circuit 44 can be included in the human-powered vehicle control device 60. The drive circuit 44 drives the motor 42 in response to a control signal from the controller 62.

The motor 42 includes an electric motor. The motor 42 is provided to transmit rotation to the front wheel or to a power transmission path of the human driving force H extending from the pedal 22 to the rear wheel. The motor 42 is provided on the frame 18, the rear wheel, or the front wheel of the human-powered vehicle 10. In the present embodiment, the motor 42 is coupled to the power transmission path extending from the crankshaft 14A to the first rotary body 26. A one-way clutch is preferably provided in the power transmission path between the motor 42 and the crankshaft 14A so that the motor 42 is not rotated by the rotational force of the crank 14 in a case where the crankshaft 14A is rotated in the direction in which the human-powered vehicle 10 moves forward. The housing on which the motor 42 and the drive circuit 44 are provided can include a structure in addition to the motor 42 and the drive circuit 44. For example, a decelerator that reaccelerates and outputs rotation of the motor 42 can be provided.

The human-powered vehicle control device 60 includes the controller 62. The controller 62 includes a processor that executes a predetermined control program. The processor includes, for example, a central processing unit (CPU) or a micro-processing unit (MPU). The controller 62 can include one or more microcomputers. The controller 62 can include more than one processors located at separate positions. The human-powered vehicle control device 60 further includes storage 64. The storage 64 stores information used for various control programs and control processes. The storage 64 includes, for example, a nonvolatile memory and a volatile memory. The controller 62 and the storage 64 are, for example, provided on the housing on which the motor 42 is provided.

Preferably, the human-powered vehicle control device 60 further includes a crank rotation sensor 66, a vehicle speed sensor 68, and a torque sensor 70. The crank rotation sensor 66, the vehicle speed sensor 68, and the torque sensor 70 can be provided inside or on the outside of the housing in which the motor 42 is provided. At least one of the crank rotation sensor 66, the vehicle speed sensor 68, and the torque sensor 70 does not have to be included in the human-powered vehicle control device 60.

The crank rotation sensor 66 is used to detect a rotational speed N of the crank 14 of the human-powered vehicle 10. The crank rotation sensor 66 is attached, for example, on the housing on which the frame 18 or the motor 42 of the human-powered vehicle 10 is provided. The crank rotation sensor 66 is configured to include a magnetic sensor that outputs a signal in accordance with the strength of the magnetic field. A ring-shaped magnet of which the magnetic field strength changes in a circumferential direction is provided in the power transmission path extending from the crankshaft 14A or the crankshaft 14A to the first rotary body 26. The crank rotation sensor 66 is connected to the controller 62 through wireless connection or wireless connection in a manner allowing for communication. The crank rotation sensor 66 outputs a signal corresponding to the rotational speed N of the crank 14 to the controller 62. The crank rotation sensor 66 can be provided on the member that rotates integrally with the crankshaft 14A in the power transmission path of the human driving force H between the crankshaft 14A and the first rotary body 26. For example, the crank rotation sensor 66 can be provided on the first rotary body 26 in a case where the first one-way clutch is not provided between the crankshaft 14A and the first rotary body 26. The crank rotation sensor 66 can be used to detect a vehicle speed V of the human-powered vehicle 10. In this case, the controller 62 calculates the rotational speed of the driving wheel 12B in accordance with the rotational speed N of the crank 14, which is detected by the crank rotation sensor 66, and the transmission ratio B to detect the vehicle speed V of the human-powered vehicle 10. Information related to the transmission ratio B is stored in the storage 64 in advance.

In a case where the human-powered vehicle 10 includes the transmission 46 for changing the transmission ratio B, the controller 62 can calculate the transmission ratio B from the relationship between the rotational speed of the second rotary body, the rotational speed of the driving wheel 12B, or the rotational speed of the driven wheel 12A and the rotational speed of the first rotary body 26 or the rotational speed N of the crank 14. For example, in a case where the transmission ratio B is calculated from the relationship of the rotational speed of the driving wheel 12B and the rotational speed N of the crank 14, the controller 62 can calculate the transmission ratio B in accordance with the vehicle speed V of the human-powered vehicle 10 and the rotational speed N of the crank 14. In this case, information related to a circumferential length of the driving wheel 12B, a diameter of the driving wheel 12B, or a radius of the driving wheel 12B is stored in the storage 64 in advance. In a case where the transmission ratio B is calculated from the relationship of the rotational speed of the second rotary body and the rotational speed of the first rotary body 26 or the rotational speed N of the crank 14, and the transmission 46 is not provided closer to the driving wheel 12B than the second rotary body 28, the controller 62 can calculate the transmission ratio B by dividing the rotational speed of the second rotary body by the rotational speed of the first rotary body 26 or the rotational speed N of the crank 14. In this case, it is preferred that a sensor that detects the rotational speed of the second rotary body and the rotational speed of the first rotary body 26 or the rotational speed N of the crank 14 be provided.

The human-powered vehicle control device 60 can include a transmission sensor. The transmission sensor is provided, for example, on the transmission 46. The transmission sensor detects the current shift stage of the transmission 46. The transmission sensor is electrically connected to the controller 62. The relationship between the shift stage and the transmission ratio B is stored in the storage 64 in advance. The controller 62 can detect the current transmission ratio B from a detection result of the transmission sensor. In a case where the transmission 46 is the rear derailleur, the transmission sensor, for example, detects the transmission ratio B with a rotational angle of a chain guide relative to a movable portion. In a case where the transmission 46 is an electric transmission, the transmission sensor, for example, detects the transmission ratio B with a rotational amount of a motor, which is provided on a movable portion or a fixed portion, and a rotational amount of a rotary member, which is included in a speed reducer connected to an output axis of a motor. The controller 62 can calculate the rotational speed N of the crank 14 by dividing the rotational speed of the driving wheel 12B by the transmission ratio B. In this case, the vehicle speed sensor 68 and the transmission sensor can be used as the crank rotation sensor 66. The transmission sensor does not have to be provided on the transmission 46, and can be provided on a shifting operating portion or a shift wire.

The vehicle speed sensor 68 is used for detecting the rotational speed of the wheel 12. The vehicle speed sensor 68 is electrically connected to the controller 62 through wired or wireless connection. The vehicle speed sensor 68 is connected to the controller 62 through wireless or wired connection in a manner allowing for communication. The vehicle speed sensor 68 outputs a signal corresponding to the rotational speed of the wheel 12 to the controller 62. The controller 62 calculates the vehicle speed V of the human-powered vehicle 10 based on the rotational speed of the wheel 12. The controller 62 stops the motor 42 in a case where the vehicle speed V becomes greater than or equal to a predetermined value. The predetermined value is, for example, 25 km per hour or 45 km per hour. The vehicle speed sensor 68 includes, for example, a magnetic reed that forms a reed switch or a Hall element. The vehicle speed sensor 68 can be configured to be mounted on a chainstay of the frame 18 and detect a magnet attached on the rear wheel. Alternatively, the vehicle speed sensor 68 can be configured to be provided on the front fork 32 and detect a magnet attached on a front wheel. In another example, the vehicle speed sensor 68 includes a GPS receiver. The controller 62 can detect the vehicle speed V of the human-powered vehicle 10 in accordance with GPS information received at the GPS receiver, map information stored in the storage 64 in advance, and time. The controller 62 preferably includes a timer for measuring time.

The torque sensor 70 is used for detecting torque TH based on the human driving force H. The torque sensor 70 is, for example, provided on the housing on which the motor 42 is provided. The torque sensor 70 detects the torque TH based on the human driving force H input to the crank 14. In a case where, for example, the first one-way clutch is provided in the power transmission path, the torque sensor 70 is provided at an upstream side of the first one-way clutch. The torque sensor 70 includes a torsion sensor, a magnetostrictive sensor, and the like. The torsion sensor includes a torsion gauge. In a case where the torque sensor 70 includes the torsion sensor, the torsion sensor is preferably provided on an outer circumferential portion of a rotary body included in the power transmission path. The torque sensor 70 can include a wireless or wired communication unit. The communication unit of the torque sensor 70 is configured to communicate with the controller 62.

The controller 62, for example, controls the motor 42 so that an assist force generated by the motor 42 to the human driving force H becomes equal to a predetermined assist ratio A. The controller 62, for example, can control the motor 42 so that output torque TM based on the assist force generated by the motor 42 becomes equal to the predetermined assist ratio A to the torque TH based on the human driving force H of the human-powered vehicle 10. The controller 62, for example, controls the motor 42 in a control mode selected from a plurality of control modes having different assist ratios A of the output of the motor 42 to the human driving force H. A torque assist ratio AT of the output torque TM of the motor 42 to the torque TH based on the human driving force H of the human-powered vehicle 10 will also be referred to as the assist ratio A. The controller 62, for example, can control the motor 42 so that power WX (watt) of the motor 42 to power WH (watt) based on the human driving force H becomes equal to the predetermined assist ratio A. An assist ratio AW of the power WX of the output of the motor 42 to the power WH based on the human driving force H of the human-powered vehicle 10 will also be referred to as the assist ratio A. The power WH based on the human driving force H is calculated by multiplying the human driving force H and the rotational speed N of the crank 14. In a case where the output of the motor 42 is input to the power path of the human driving force H through a decelerator, the output of the decelerator corresponds to the output of the motor 42. The controller 62 outputs a control instruction to the drive circuit 44 of the motor 42 in accordance with the power WH or the torque TH based on the human driving force H. The control instruction includes a torque instruction value.

The controller 62 controls the motor 42 so that an upper limit value X of the output of the motor 42 is less than or equal to a predetermined value. The controller 62, for example, controls the motor 42 in a control mode selected from multiple control modes having different upper limit values X. The output of the motor 42 includes the output torque TM of the motor 42. The output of the motor 42 can include the power WX of the motor 42. In this case, the controller 62 controls the motor 42 so that the power WX of the motor 42 is less than or equal to a predetermined value WX1. In one example, the predetermined value WX1 is 500 watts. In another example, the predetermined value WX1 is 300 watts. The controller 62 can control the motor 42 so that the torque assist ratio AT is less than or equal to a predetermined torque assist ratio AT1. In one example, the predetermined torque assist ratio AT1 is 300%.

In each of the control modes, at least one of the assist ratio A and the upper limit value X of the output of the motor 42 can be different. In each of the control modes, only the assist ratio A, only the upper limit value X, or both of the assist ratio A and the upper limit value X can be different. In this case, the controller 62 controls the motor 42 so that the output of the motor 42 is less than or equal to the assist ratio A determined for the selected control mode of the motor 42 and less than or equal to a predetermined value.

The human-powered vehicle 10 includes a movable member 48 that extends and retracts. The extending or retracting action preferably includes movement of 3 cm or greater. The extending or retracting action further preferably includes movement of 5 cm or greater and even further preferably movement of 6 cm or greater. The extending or retracting action preferably includes a linear action of a member included in the movable member 48. One example of the movable member 48 is an adjustable seatpost 50. The adjustable seatpost 50 includes a connection portion 50A to which the saddle 20 is attached. The adjustable seatpost 50 includes a hollow outer member 52 and a hollow inner member 54. The outer member 52 is mounted on the frame 18. The inner member 54 is at least partially accommodated inside the outer member 52. The inner member 54 includes a first end 54A that projects from the outer member 52. The connection portion 50A is provided on the first end 54A of the inner member 54.

The adjustable seatpost 50 can be of an air type, a hydraulic type, or an electric type including an electric actuator 50B. The electric actuator includes an electric motor. The adjustable seatpost 50 can be configured so that the extending or retracting action is restricted or promoted depending on the load added on the saddle 20.

The adjustable seatpost 50 extensibly moves in a case where the first end 54A of the inner member 54 moves in a direction toward the outer member 52 or in a direction away from the outer member 52 changing the length of the inner member 54 accommodated in the outer member 52. In a case where the first end 54A of the inner member 54 moves in the direction toward the outer member 52, the adjustable seatpost 50 is actuated to move the outer member 52 and the inner member 54 toward each other. In a case where the first end 54A of the inner member 54 moves in the direction away from the outer member 52, the adjustable seatpost 50 is actuated to move the outer member 52 and the inner member 54 away from other.

In a case where the adjustable seatpost 50 is actuated to move the outer member 52 and the inner member 54 toward each other, the accommodated length of the inner member 54 in the outer member is increased. Accordingly, the first end 54A of the inner member 54 moves downward and thus the connection portion 50A and the saddle 20 move downward.

In a case where the adjustable seatpost 50 is actuated to move the outer member 52 and the inner member 54 away from each other, the accommodated length of the inner member 54 in the outer member 52 is decreased. Accordingly, the first end 54A of the inner member 54 moves upward and thus the connection portion 50A and the saddle 20 move upward.

The human-powered vehicle 10 preferably further includes an operation device 56 for operating the adjustable seatpost 50. The operation device 56 is preferably provided on the handlebar 38. The operation device 56, for example, includes a lever. The adjustable seatpost 50 extensibly moves in accordance with a moving direction of the lever.

The control device 60 includes the controller 62 configured to control the motor 42 that assists propulsion of the human-powered vehicle 10 including the movable member 48 that is extensible and retractable. The controller 62 controls the motor 42 in accordance with the actuation of the movable member 48 during the extending or retracting action. The controller 62 preferably controls the motor 42 in accordance with at least one of an actuating direction and an actuating speed of the movable member 48.

The movable member 48 of the present embodiment is the adjustable seatpost 50 that includes the outer member 52 and the inner member 54. In a case where the adjustable seatpost 50 is actuated to move the outer member 52 and the inner member 54 away from each other, the controller 62 increases the assist ratio A of the motor 42 to the human driving force H input to the human-powered vehicle 10. In a case where the connection portion 50A and the saddle 20 move upward, the controller 62 increases the assist ratio A. The controller 62 can increase the assist ratio A by changing to one of the control modes having a higher assist ratio A or by increasing the assist ratio A determined for the currently set control mode.

Preferably, in a case where the adjustable seatpost 50 is actuated to move the outer member 52 and the inner member 54 toward each other, the controller 62 decreases the assist ratio A of the motor 42. In a case where the connection portion 50A and the saddle 20 move downward, the controller 62 decreases the assist ratio A. The controller 62 can decrease the assist ratio A by changing to one of the control modes having a lower assist ratio A or by decreasing the assist ratio A determined for the currently set control mode. The controller 62 can set the assist ratio A to 0 to stop the motor 42.

The control device 60 can further include a detector 72 that detects the actuation of the adjustable seatpost 50. The detector 72 outputs a signal corresponding to the actuation of the adjustable seatpost 50 to the controller 62.

In one example, in a case where the detector 72 detects actuation in which the connection portion 50A moves downward, the controller 62 determines that the adjustable seatpost 50 is actuated to move the outer member 52 and the inner member 54 toward each other. In a case where the detector 72 detects actuation in which the connection portion 50A moves upward, the controller 62 determines that the adjustable seatpost 50 is actuated to move the outer member 52 and the inner member 54 away from each other. In this case, the detector 72 outputs a signal corresponding to the movement of the inner member 54 relative to the outer member 52 to the controller 62. In this case, the detector 72 can be a linear encoder or a potentiometer. The detector 72 can be an optical sensor or a magnetic sensor.

In another example, in a case where the detector 72 detects operation of the operation device 56 that moves the connection portion 50A downward, the controller 62 determines that the adjustable seatpost 50 is actuated to move the outer member 52 and the inner member 54 toward each other. In a case where the detector 72 detects operation of the operation device 56 that moves the connection portion 50A upward, the controller 62 determines that the adjustable seatpost 50 is actuated to move the outer member 52 and the inner member 54 away from each other. In this case, the detector 72 outputs a signal corresponding to the movement of a mechanical cable, which connects the operation device 56 or the operation device 56 and the adjustable seatpost 50, to the controller 62. In a case where the adjustable seatpost 50 is configured so that the extending or retracting action is restricted or promoted depending on the load added on the saddle 20, if the actuation in which the connection portion 50A is moved downward is performed by the operation device 56, the controller 62 can determine that the adjustable seatpost 50 is actuated to move the outer member 52 and the inner member 54 toward each other even if that the connection portion 50A is not moved. In a case where the adjustable seatpost 50 is configured so that the extending or retracting action is restricted or promoted depending on the load added on the saddle 20, if the actuation in which the connection portion 50A is moved upward is performed by the operation device 56, the controller 62 can determine that the adjustable seatpost 50 is actuated to move the outer member 52 and the inner member 54 away from each other even if the connection portion 50A is not moved.

In a case where the actuation of the adjustable seatpost 50 to move the outer member 52 and the inner member 54 away from each other is completed, the controller 62 can change the assist ratio A back to the assist ratio A prior to the change in correspondence with a determination that the adjustable seatpost 50 is actuated to the move outer member 52 and the inner member 54 away from each other. In a case where the actuation of the adjustable seatpost 50 to move the outer member 52 and the inner member 54 toward each other is completed, the controller 62 can change the assist ratio A back to the assist ratio A prior to the change in correspondence with a determination that the adjustable seatpost 50 is actuated to move the outer member 52 and the inner member 54 toward each other.

Figure 3:
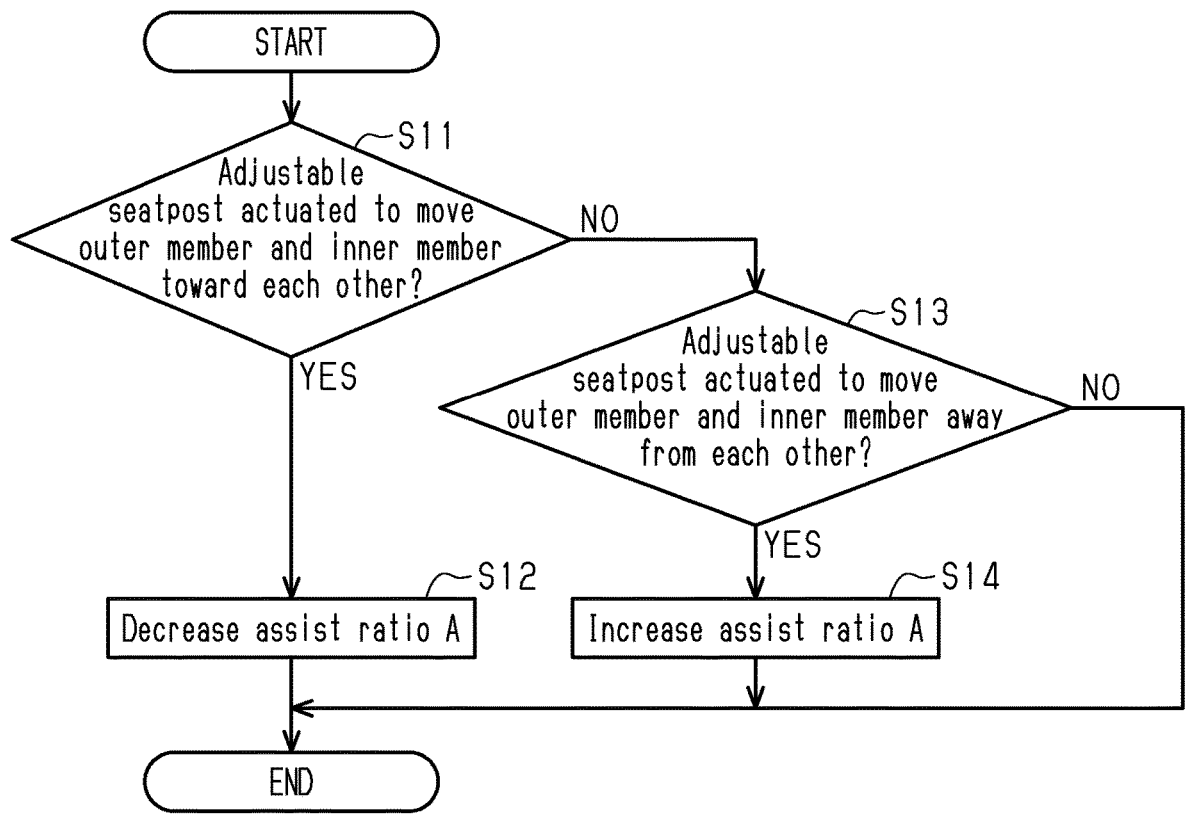
FIG. 3 is a flowchart illustrating a process for changing an assist ratio executed by a controller shown in FIG. 2.

With reference to FIG. 3, a process for changing the assist ratio A of the motor 42 in accordance with the extending or retracting action of the movable member 48 will now be described. In a case where the electric power is supplied to the controller 62, the controller 62 starts the process and proceeds to step S11 of the flowchart shown in FIG. 3. In a case where the process illustrated by the flowchart in FIG. 3 ends, the controller 62 repeats the process from step S11 after a predetermined cycle until the supply of the electric power stops.

In step S11, the controller 62 determines whether the adjustable seatpost 50 is actuated to move the outer member 52 and the inner member 54 toward each other. In a case where the adjustable seatpost 50 is actuated to move the outer member 52 and the inner member 54 toward each other, the controller 62 proceeds to step S12. In step S12, the controller 62 decreases the assist ratio A and then ends the process.

In step S11, in a case where the adjustable seatpost 50 is not actuated to move the outer member 52 and the inner member 54 toward each other, the controller 62 proceeds to step S13. In step S13, the controller 62 determines whether the adjustable seatpost 50 is actuated to move the outer member 52 and the inner member 54 away from each other. In a case where the adjustable seatpost 50 is actuated to move the outer member 52 and the inner member 54 away from each other, the controller 62 proceeds to step S14. In step S14, the controller 62 increases the assist ratio A and then ends the process.

In step S13, in a case where the adjustable seatpost 50 is not actuated to move the outer member 52 and the inner member 54 away from each other, the controller 62 ends the process.

For example, in a case where the posture of a rider on a mountain bike shifts from seated pedaling to standing pedaling, the rider will lower the height position of the saddle 20 and ride the human-powered vehicle 10 in a manner that continuously and abruptly changes the behavior of the human-powered vehicle 10. The controller 62 decreases the assist ratio A while lowering the height position of the saddle 20 so the rider can easily stabilize the behavior of the human-powered vehicle 10.

For example, in a case where a rider travels downhill on a mountain bike, the rider will lower the height position of the saddle 20 and ride the human-powered vehicle 10 in a state unseated on the saddle 20 or in a state in which the load applied on the saddle 20 by the rider is small in a manner that continuously and abruptly changes the behavior of the human-powered vehicle 10. The controller 62 decreases the assist ratio A while lowering the height position of the saddle 20 so the rider can easily stabilize the behavior of the human-powered vehicle 10.

For example, in a case where the posture of a rider on a mountain bike shifts from standing pedaling to seated pedaling, the rider will raise the height position of the saddle 20 and rides the human-powered vehicle 10 in a manner in which the traveling speed of the human-powered vehicle 10 becomes constant. The controller 62 increases the assist ratio A while raising the height position of the saddle 20 so that the motor 42 can assist the human driving force H in a preferred manner.

For example, a rider on a mountain bike travels uphill, the rider will raise the height position of the saddle 20 and travel. The controller 62 increases the assist ratio A while raising the height position of the saddle 20 so that the rider can travel uphill comfortably.

Second Embodiment

Figure 4:
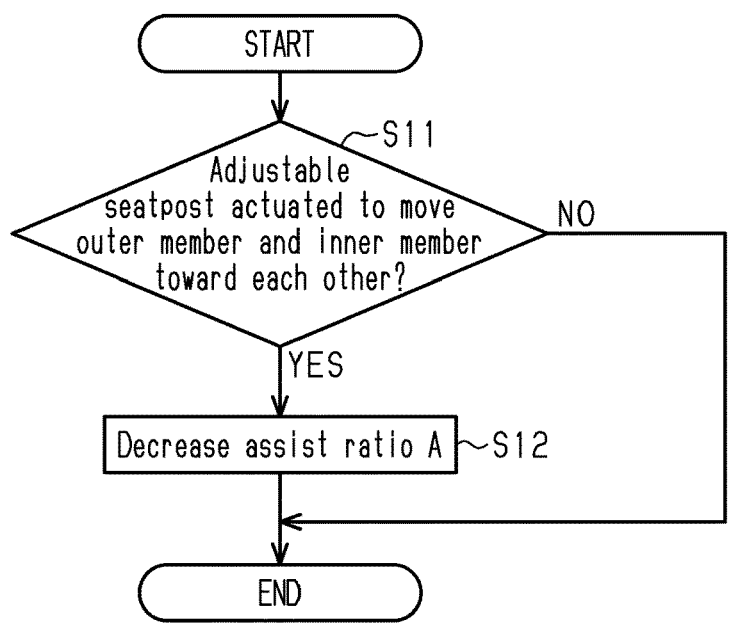
FIG. 4 is a flowchart illustrating a process for changing an assist ratio executed by a controller in accordance with a second embodiment.

With reference to FIG. 4, the control device 60 in accordance with the second embodiment will now be described. The control device 60 in accordance with the second embodiment is the same as the control device 60 in accordance with the first embodiment except that the motor 42 is controlled in accordance with the extending or retracting action of the movable member 48. Thus, same reference numerals are given to those components that are the same as the corresponding components of the first embodiment. Such components will not be described in detail.

The movable member 48 of the present embodiment is the adjustable seatpost 50 that includes the outer member 52 and the inner member 54. In a case where the adjustable seatpost 50 is actuated to move the outer member 52 and the inner member 54 toward each other, the controller 62 decreases the assist ratio A of the motor 42 to the human driving force H input to the human-powered vehicle 10.

In the present embodiment, in a case where the adjustable seatpost 50 is actuated to move the outer member 52 and the inner member 54 away from each other, the controller 62 does not increase the assist ratio A. The controller 62 increases the assist ratio A in a case where an operation to increase the assist ratio A is performed on an assist operating unit, which changes the control mode of the motor 42. Alternately, the controller 62 increases the assist ratio A in accordance with a traveling state of the human-powered vehicle 10.

With reference to FIG. 4, a process for changing the assist ratio A of the motor 42 in accordance with the extending or retracting action of the movable member 48 will now be described. In a case where the electric power is supplied to the controller 62, the controller 62 starts the process and proceeds to step S11 of the flowchart shown in FIG. 4. In a case where the process illustrated by the flowchart in FIG. 4 ends, the controller 62 repeats the process from step S11 after a predetermined cycle until the supply of the electric power stops.

In step S11, the controller 62 determines whether the adjustable seatpost 50 is actuated to move the outer member 52 and the inner member 54 toward each other. In a case where the adjustable seatpost 50 is actuated to move the outer member 52 and the inner member 54 toward each other, the controller 62 proceeds to step S12. In step S12, the controller 62 decreases the assist ratio A and then ends the process.

In step S11, in a case where the adjustable seatpost 50 is not actuated to move the outer member 52 and the inner member 54 toward each other, the controller 62 ends the process.

Third Embodiment

Figure 5:
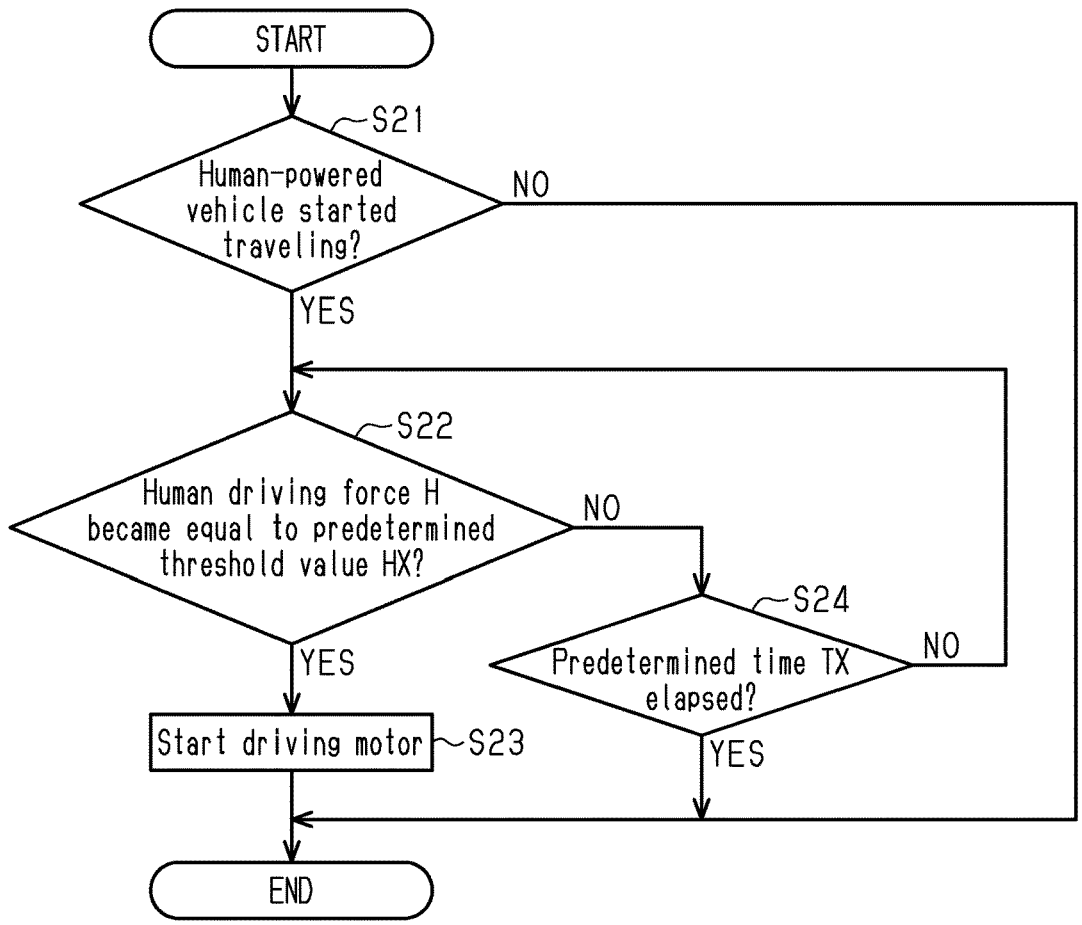
FIG. 5 is a flowchart illustrating a process for starting driving a motor executed by a controller in accordance with a third embodiment.
Figure 6:
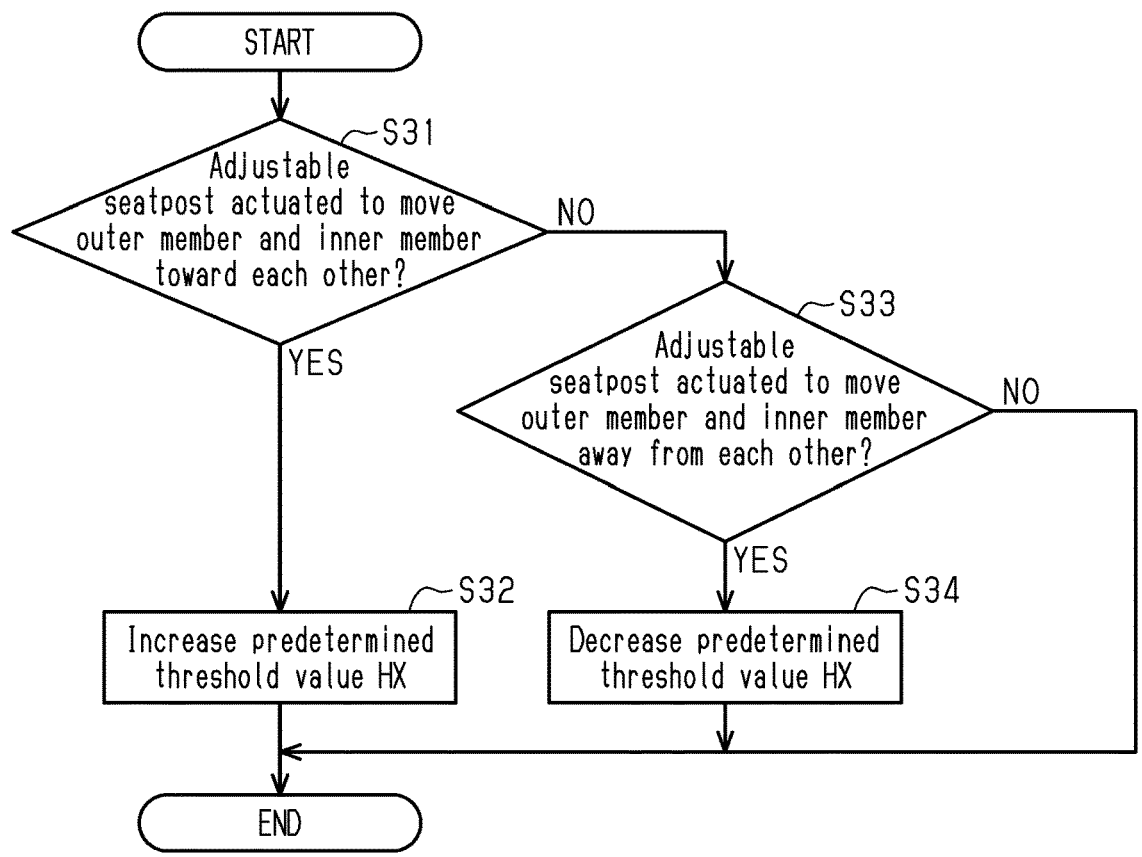
FIG. 6 is a flowchart illustrating a process for changing a predetermined threshold value executed by the controller in accordance with the third embodiment.

With reference to FIGS. 5 and 6, the control device 60 in accordance with the third embodiment will now be described. The control device 60 in accordance with the third embodiment is the same as the control device 60 in accordance with the first embodiment except that the motor 42 is controlled in accordance with the extending or retracting action of the movable member 48. Thus, same reference numerals are given to those components that are the same as the corresponding components of the first embodiment. Such components will not be described in detail.

The movable member 48 of the present embodiment is the adjustable seatpost 50 that includes the outer member 52 and the inner member 54. In a case where the human driving force H input to the human-powered vehicle 10 becomes equal to a predetermined threshold value HX, the controller 62 starts driving the motor 42. In a case where the adjustable seatpost 50 is actuated to move the outer member 52 and the inner member 54 away from each other, the controller 62 decreases the predetermined threshold value HX. Preferably, in a case where the adjustable seatpost 50 is actuated to move the outer member 52 and the inner member 54 toward each other, the controller 62 increases the predetermined threshold value HX.

In a case where the adjustable seatpost 50 is not actuated, the controller 62 can use the predetermined threshold value HX that is preset. After changing the predetermined threshold value HX in accordance with the extending or retracting action of the movable member 48, if the extending or retracting action has ended, the controller 62 can change the predetermined threshold value HX back to the preset predetermined threshold value HX.

With reference to FIG. 5, a process for starting driving the motor 42 will now be described. In a case where the electric power is supplied to the controller 62, the controller 62 starts the process and proceeds to step S21 of the flowchart shown in FIG. 5. In a case where the process illustrated by the flowchart in FIG. 5 ends, the controller 62 repeats the process from step S21 after a predetermined cycle until the supply of the electric power stops.

In step S21, the controller 62 determines whether the human-powered vehicle 10 has stared traveling. The controller 62 determines that the human-powered vehicle 10 has started traveling, for example, in a case where the crank 14 has started rotating. Specifically, the controller 62 determines that the crank 14 has started rotating in a case where the rotational speed N of the crank 14 has shifted from a predetermined speed NX or less to greater than the predetermined speed NX. The predetermined speed NX is, for example, 0 rpm. The controller 62 can determine that the human-powered vehicle 10 has started traveling in a case where the input of the human driving force H has started. Specifically, the controller 62 determines that the input of the human-powered vehicle 10 has started in a case where the human driving force H shifted from 0 to greater than 0. In a case where the human-powered vehicle 10 has not started traveling, the controller 62 ends the process. In a case where the human-powered vehicle 10 has started traveling, the controller 62 proceeds to step S22.

In step S22, the controller 62 determines whether the human driving force H has become equal to the predetermined threshold value HX. In a case where the controller 62 determines that the human driving force H has become equal to the predetermined threshold value HX, the controller 62 proceeds to step S23. In step S23, the controller 62 starts driving the motor 42 and then ends the process. From step S23, the controller 62 drives the motor 42 in accordance with the assist ratio A of the selected control mode.

In step S22, in a case where the human driving force H has not become equal to the predetermined threshold value HX, the controller 62 proceeds to step S24. In step S24, the controller 62 determines whether a predetermined time TX has elapsed. In step S24, for example, in a case where the predetermined time TX has elapsed since the crank 14 was determined to have started rotating, the controller 62 determines that the predetermined time TX has elapsed. In step S24, in a case where the controller 62 determines that the predetermined time TX has elapsed, the controller 62 ends the process. In a case where the controller 62 determines that the predetermined time TX has not elapsed, the controller 62 performs again the determination process of step S22.

With reference to FIG. 6, a process for changing the predetermined threshold value HX in accordance with the extending or retracting action of the movable member 48 will now be described. In a case where the electric power is supplied to the controller 62, the controller 62 starts the process and proceeds to step S31 of the flowchart shown in FIG. 6. In a case where the process illustrated by the flowchart in FIG. 6 ends, the controller 62 repeats the process from step S31 after a predetermined cycle until the supply of the electric power stops.

In step S31, the controller 62 determines whether the adjustable seatpost 50 is actuated to move the outer member 52 and the inner member 54 toward each other. In a case where the adjustable seatpost 50 is actuated to move the outer member 52 and the inner member 54 toward each other, the controller 62 proceeds to step S32. In step S32, the controller 62 increases the predetermined threshold value HX and then ends the process.

In step S31, in a case where the adjustable seatpost 50 is not actuated to move the outer member 52 and the inner member 54 toward each other, the controller 62 proceeds to step S33. In step S33, the controller 62 determines whether the adjustable seatpost 50 is actuated to move the outer member 52 and the inner member 54 away from each other. In a case where the adjustable seatpost 50 is actuated to move the outer member 52 and the inner member 54 away from each other, the controller 62 proceeds to step S34. In step S34, the controller 62 decreases the predetermined threshold value HX and then ends the process.

In step S33, in a case where the adjustable seatpost 50 is not actuated to move the outer member 52 and the inner member 54 away from each other, the controller 62 ends the process.

The controller 62 increases the predetermined threshold value HX while lowering the height position of the saddle 20 so that the driving of the motor 42 is delayed and that the rider can easily stabilize the behavior of the human-powered vehicle 10. The controller 62 decreases the predetermined threshold value HX while raising the height position of the saddle 20 so that the motor 42 can readily assist the human driving force H.

Fourth Embodiment

Figure 7:
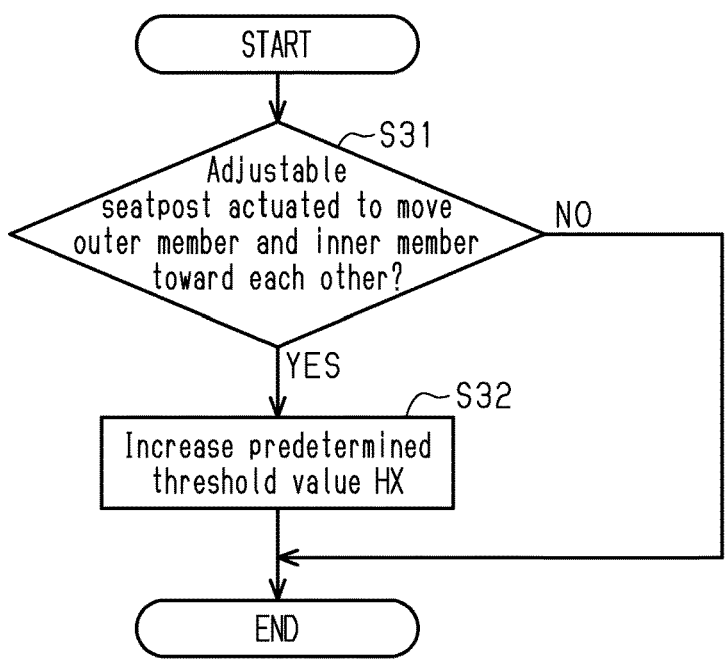
FIG. 7 is a flowchart illustrating a process for changing a predetermined threshold value executed by a controller in accordance with a fourth embodiment.

With reference to FIG. 7, the control device 60 in accordance with the fourth embodiment will now be described. The control device 60 in accordance with the fourth embodiment is the same as the control device 60 in accordance with the third embodiment except that the motor 42 is controlled in accordance with the extending or retracting action of the movable member 48. Thus, same reference numerals are given to those components that are the same as the corresponding components of the first and third embodiments. Such components will not be described in detail.

The movable member 48 of the present embodiment is the adjustable seatpost 50 that includes the outer member 52 and the inner member 54. In a case where the human driving force H input to the human-powered vehicle 10 becomes equal to the predetermined threshold value HX, the controller 62 starts driving the motor 42. In a case where the adjustable seatpost 50 is actuated to move the outer member 52 and the inner member 54 toward each other, the controller 62 increases the predetermined threshold value HX.

In the present embodiment, in a case where the adjustable seatpost 50 is actuated to move the outer member 52 and the inner member 54 away from each other, the controller 62 does not decrease the predetermined threshold value HX. After changing the predetermined threshold value HX in accordance with the extending or retracting action of the movable member 48, if the extending or retracting action of the movable member 48 has ended, the controller 62 can change the predetermined threshold value HX back to the preset predetermined threshold value HX.

With reference to FIG. 7, a process for changing the predetermined threshold value HX in accordance with the extending or retracting action of the movable member 48 will now be described. In a case where the electric power is supplied to the controller 62, the controller 62 starts the process and proceeds to step S31 of the flowchart shown in FIG. 7. In a case where the process illustrated by the flowchart in FIG. 7 ends, the controller 62 repeats the process from step S31 after a predetermined cycle until the supply of the electric power stops.

In step S31, the controller 62 determines whether the adjustable seatpost 50 is actuated to move the outer member 52 and the inner member 54 toward each other. In a case where the adjustable seatpost 50 is actuated to move the outer member 52 and the inner member 54 toward each other, the controller 62 proceeds to step S32. In step S32, the controller 62 increases the predetermined threshold value HX and then ends the process.

In step S31, in a case where the adjustable seatpost 50 is not actuated to move the outer member 52 and the inner member 54 toward each other, the controller 62 ends the process.

Fifth Embodiment

Figure 8:
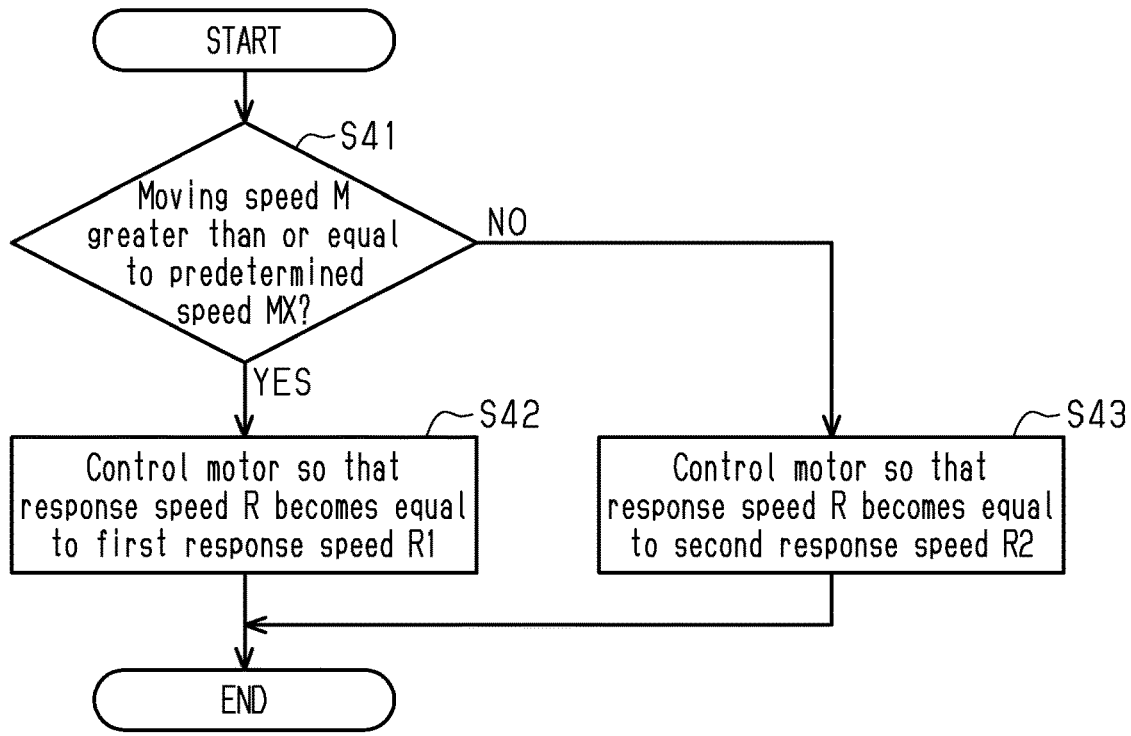
FIG. 8 is a flowchart illustrating a process for changing a response speed executed by a controller in accordance with a fifth embodiment.

With reference to FIG. 8, the control device 60 in accordance with the fifth embodiment will now be described. The control device 60 in accordance with the fifth embodiment is the same as the control device 60 in accordance with the first embodiment except that the motor 42 is controlled in accordance with the extending or retracting action of the movable member 48. Thus, same reference numerals are given to those components that are the same as the corresponding components of the first embodiment. Such components will not be described in detail.

The controller 62 changes a response speed R of an output change of the motor 42 with respect to a change rate of the human driving force H in accordance with the traveling state of the human-powered vehicle 10. The traveling state of the human-powered vehicle 10 includes changes in the human driving force H. For example, the controller 62 sets the response speed R in a case where the human driving force H decreases to be lower than the response speed R in a case where the human driving force H increases. In this case, in a case where the human driving force H increases, the output of the motor 42 easily increases along with the increase in the human driving force H. Further, in a case where the human driving force H decreases, decreases in the output of the motor 42 can be limited. The controller 62 preferably includes a filter for changing the response speed R. The controller 62 is configured to change the response speed R by changing a time constant.

The movable member 48 of the present embodiment is the adjustable seatpost 50 that includes the outer member 52 and the inner member 54. In a case where a moving speed M of the inner member 54 relative to the outer member 52 is greater than or equal to a predetermined speed MX, the controller 62 controls the motor 42 so that the response speed R of the motor 42 becomes equal to a first response speed R1. In a case where the moving speed M of the inner member 54 relative to the outer member 52 is less than the predetermined speed MX, the controller 62 controls the motor 42 so that the response speed R of the motor 42 becomes equal to a second response speed R2. The first response speed R1 is lower than the second response speed R2.

The controller 62 preferably sets the response speed R in a case where the human driving force H increases at the first response speed R1 to be lower than the response speed R in a case where the human driving force H increases at the second response speed R2. The controller 62 can set the response speed R in a case where the human driving force H decreases at the first response speed R1 to be equal to the response speed R in a case where the human driving force H increases at the second response speed R2 or higher than the response speed R in a case where the human driving force H increases at the second response speed R2.

With reference to FIG. 8, a process for changing the response speed R in accordance with the extending or retracting action of the movable member 48 will now be described. In a case where the electric power is supplied to the controller 62, the controller 62 starts the process and proceeds to step S41 of the flowchart shown in FIG. 8. In a case where the process illustrated by the flowchart in FIG. 8 ends, the controller 62 repeats the process from step S41 after a predetermined cycle until the supply of the electric power stops.

In step S41, the controller 62 determines whether the moving speed M is greater than or equal to the predetermined speed MX. In a case where the moving speed M is greater than or equal to the predetermined speed MX, the controller 62 proceeds to step S42. In step S42, the controller 62 controls the motor 42 so that the response speed R becomes equal to the first response speed R1 and then ends the process.

In step S41, in a case where the moving speed M less than the predetermined speed MX, the controller 62 proceeds to step S43. In step S43, the controller 62 controls the motor 42 so that the response speed R becomes equal to the second response speed R2 and then ends the process.

In a case where the moving speed M of the inner member 54 relative to the outer member 52 is greater than or equal to the predetermined speed MX, the motor 42 is controlled at the first response speed R1. Thus, the output of the motor 42 does not easily increase in a case where the human driving force H increases. In this manner, the rider can easily change the posture in a preferred manner by quickly operating the adjustable seatpost 50 in a state in which the output of the motor 42 is limited and the behavior of the human-powered vehicle 10 is stable.

Sixth Embodiment

Figure 9:
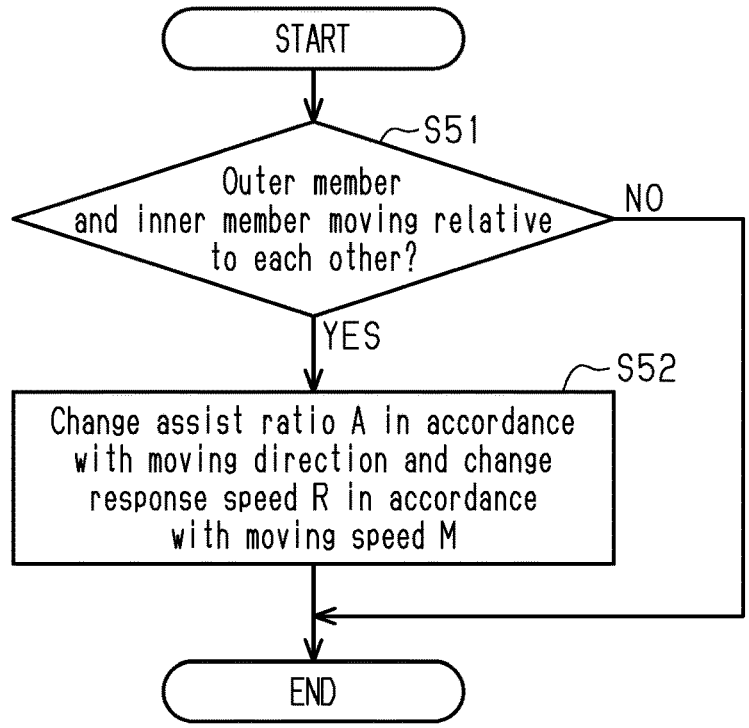
FIG. 9 is a flowchart illustrating a process for changing an assist ratio and a response speed executed by a controller in accordance with a sixth embodiment.

With reference to FIG. 9, the control device 60 in accordance with the sixth embodiment will now be described. The control device 60 in accordance with the sixth embodiment is the same as the control device 60 in accordance with the first and fifth embodiments except that the motor 42 is controlled in accordance with the extending or retracting action of the movable member 48. Thus, same reference numerals are given to those components that are the same as the corresponding components of the first and fifth embodiments. Such components will not be described in detail.

The movable member 48 of the present embodiment is the adjustable seatpost 50 that includes the outer member 52 and the inner member 54. The controller 62 changes the assist ratio A of the motor 42 to the human driving force H input to the human-powered vehicle 10 in accordance with the moving direction of the inner member 54 relative to the outer member 52. The controller 62 changes the response speed R of the motor 42 in accordance with the moving speed M of the inner member 54 relative to the outer member 52.

The controller 62 preferably increases the assist ratio A in a case where the adjustable seatpost 50 is actuated to move the outer member 52 and the inner member 54 away from each other. The controller 62 preferably increases the assist ratio A in a case where the connection portion 50A and the saddle 20 move upward. The controller 62 can increase the assist ratio A by changing to one of the control modes having a higher assist ratio A.

The controller 62 preferably decreases the assist ratio A in a case where the adjustable seatpost 50 is actuated to move the outer member 52 and the inner member 54 toward each other. The controller 62 preferably decreases the assist ratio A in a case where the connection portion 50A and the saddle 20 move downward. The controller 62 can decrease the assist ratio A by changing to one of the control modes having a lower assist ratio A. The controller 62 can set the assist ratio A to 0 and stops the motor 42.

The controller 62 preferably controls the motor 42 so that the response speed R of the motor 42 becomes equal to the first response speed R1 in a case where the moving speed M is greater than or equal to the predetermined speed MX. The controller 62 preferably controls the motor 42 so that the response speed R of the motor 42 becomes equal to a second response speed R2 in a case where the moving speed M of the inner member 54 relative to the outer member 52 is less than the predetermined speed MX. The first response speed R1 is preferably lower than the second response speed R2. The controller 62 preferably sets the response speed R in a case where the human driving force H increases at the first response speed R1 to be lower than the response speed R in a case where the human driving force H increases at the second response speed R2. The controller 62 can set the response speed R in a case where the human driving force H decreases at the first response speed R1 to be equal to the response speed R in a case where the human driving force H increases at the second response speed R2 or higher than the response speed R in a case where the human driving force H increases at the second response speed R2.

With reference to FIG. 9, a process for changing the assist ratio A and the response speed R in accordance with the extending or retracting action of the movable member 48 will now be described. In a case where the electric power is supplied to the controller 62, the controller 62 starts the process and proceeds to step S51 of the flowchart shown in FIG. 9. In a case where the process illustrated by the flowchart in FIG. 9 ends, the controller 62 repeats the process from step S51 after a predetermined cycle until the supply of the electric power stops.

In step S51, the controller 62 determines whether the outer member 52 and the inner member 54 are moving relative to each other. In a case where the outer member 52 and the inner member 54 are moving relative to each other, the controller 62 proceeds to step S52. In step S52, the controller 62 changes the assist ratio A in accordance with the moving direction and changes the response speed R in accordance with the moving speed M. Then, the controller 62 ends the process.

In a case where the outer member 52 and the inner member 54 are not moving relative to each other, the controller 62 ends the process. In this case, the motor 42 is preferably controlled in accordance with a predetermined assist ratio A and a predetermined response speed R. The predetermined response speed R is preferably equal to the second response speed R2 of the sixth embodiment.

Seventh Embodiment

Figure 10:
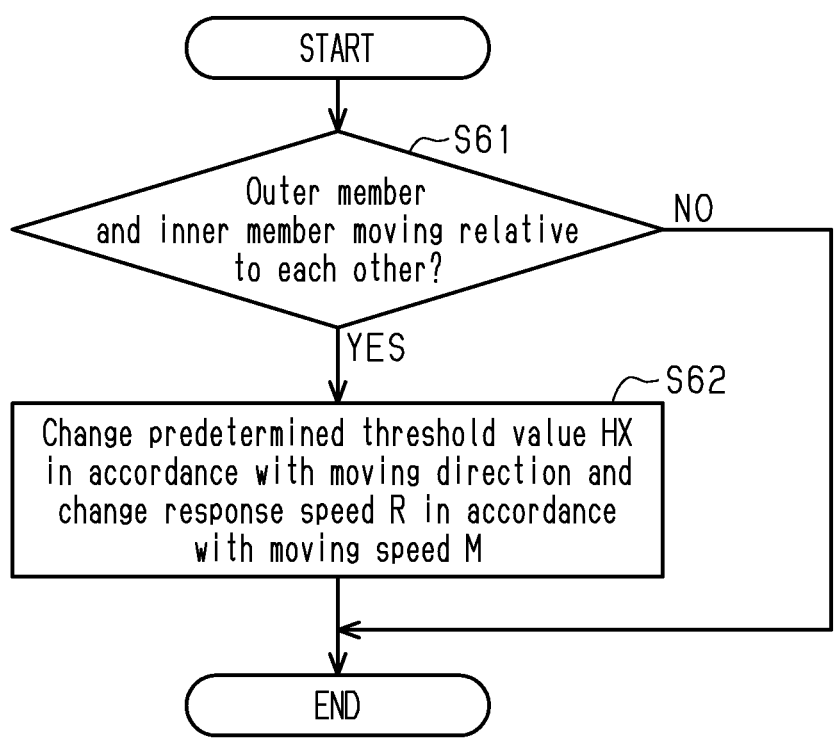
FIG. 10 is a flowchart illustrating a process for changing a predetermined threshold value and a response speed executed by a controller in accordance with a seventh embodiment.

With reference to FIG. 10, the control device 60 in accordance with the seventh embodiment will now be described. The control device 60 in accordance with the seventh embodiment is the same as the control device 60 in accordance with the first, third, and fifth embodiments except that the motor 42 is controlled in accordance with the extending or retracting action of the movable member 48. Thus, same reference numerals are given to those components that are the same as the corresponding components of the first, third, and fifth embodiments. Such components will not be described in detail.

The movable member 48 of the present embodiment is the adjustable seatpost 50 that includes the outer member 52 and the inner member 54. In a case where the human driving force H input to the human-powered vehicle 10 becomes equal to the predetermined threshold value HX, the controller 62 starts driving the motor 42. The controller 62 changes the predetermined threshold value HX in accordance with the moving direction of the inner member 54 relative to the outer member 52. The controller 62 changes the response speed R of the motor 42 in accordance with the moving speed M of the inner member 54 relative to the outer member 52.

The controller 62 preferably decreases the predetermined threshold value HX in a case where the adjustable seatpost 50 is actuated to move the outer member 52 and the inner member 54 away from each other. The controller 62 preferably increases the predetermined threshold value HX in a case where the adjustable seatpost 50 is actuated to move the outer member 52 and the inner member 54 toward each other.

The controller 62 preferably controls the motor 42 so that the response speed R of the motor 42 becomes equal to the first response speed R1 in a case where the moving speed M is greater than or equal to the predetermined speed MX. The controller 62 preferably controls the motor 42 so that the response speed R of the motor 42 becomes equal to a second response speed R2 in a case where the moving speed M of the inner member 54 relative to the outer member 52 is less than the predetermined speed MX. The first response speed R1 is preferably lower than the second response speed R2. The controller 62 preferably sets the response speed R in a case where the human driving force H increases at the first response speed R1 to be lower than the response speed R in a case where the human driving force H increases at the second response speed R2. The controller 62 can set the response speed R in a case where the human driving force H decreases at the first response speed R1 to be equal to the response speed R in a case where the human driving force increases H at the second response speed R2 or higher than the response speed R in a case where the human driving force H increases at the second response speed R2.

With reference to FIG. 10, a process for changing the response speed R in accordance with the extending or retracting action of the movable member 48 and the predetermined threshold value HX will now be described. In a case where the electric power is supplied to the controller 62, the controller 62 starts the process and proceeds to step S61 of the flowchart shown in FIG. 10. In a case where the process illustrated by the flowchart in FIG. 10 ends, the controller 62 repeats the process from step S61 after a predetermined cycle until the supply of the electric power stops.

In step S61, the controller 62 determines whether the outer member 52 and the inner member 54 are moving relative to each other. In a case where the outer member 52 and the inner member 54 are moving relative to each other, the controller 62 proceeds to step S62. In step S62, the controller 62 changes the predetermined threshold value HX in accordance with the moving direction and changes the response speed R in accordance with the moving speed M. Then, the controller 62 ends the process.

In a case where the outer member 52 and the inner member 54 are not moving relative to each other, the controller 62 ends the process. In this case, the motor 42 is preferably controlled in accordance with a predetermined assist ratio A and a predetermined response speed R.

Eighth Embodiment

Figure 11:
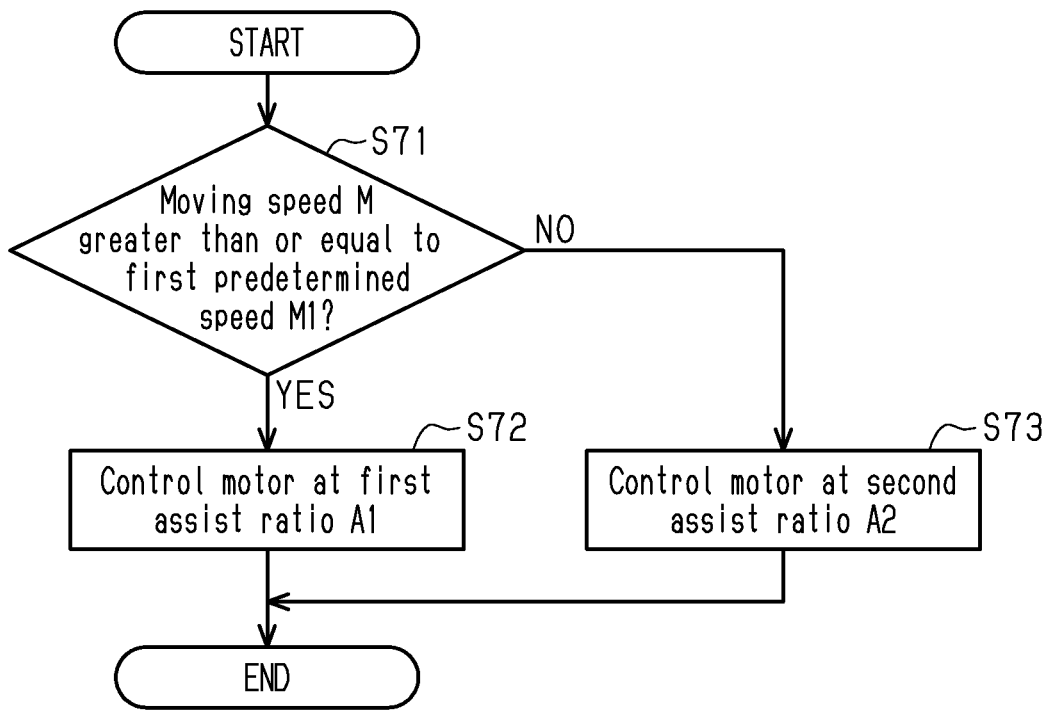
FIG. 11 is a flowchart illustrating a process for changing an assist rate executed by a controller in accordance with an eight embodiment.

With reference to FIG. 11, the control device 60 in accordance with the eighth embodiment will now be described. The control device 60 in accordance with the eighth embodiment is the same as the control device 60 in accordance with the first and fifth embodiments except that the motor 42 is controlled in accordance with the extending or retracting action of the movable member 48. Thus, same reference numerals are given to those components that are the same as the corresponding components of the first and fifth embodiments. Such components will not be described in detail.

The movable member 48 of the present embodiment is the adjustable seatpost 50 that includes the outer member 52 and the inner member 54. In a case where the moving speed M of the inner member 54 relative to the outer member 52 is greater than or equal to a first predetermined speed M1, the controller 62 controls the motor 42 at a first assist ratio A1. In a case where the moving speed M of the inner member 54 relative to the outer member 52 is less than the first predetermined speed M1, the controller 62 controls the motor 42 at a second assist ratio A2. The first assist ratio A1 is less than the second assist ratio A2.

With reference to FIG. 11, a process for changing the assist ratio A in accordance with the extending or retracting action of the movable member 48 will now be described. In a case where the electric power is supplied to the controller 62, the controller 62 starts the process and proceeds to step S71 of the flowchart shown in FIG. 11. In a case where the process illustrated by the flowchart in FIG. 11 ends, the controller 62 repeats the process from step S71 after a predetermined cycle until the supply of the electric power stops.

In step S71, the controller 62 determines whether the moving speed M is greater than or equal to the first predetermined speed M1. In a case where the moving speed M is greater than or equal to the first predetermined speed M1, the controller 62 proceeds to step S72. In step S72, the controller 62 controls the motor 42 at the first assist ratio A1 and then ends the process.

In step S71, in a case where the moving speed M is less than the first predetermined speed M1, the controller 62 proceeds to step S73. In step S73, the controller 62 controls the motor 42 at the second assist ratio A2 and then ends the process.

In a case where the moving speed M of the inner member 54 relative to the outer member 52 is greater than or equal to the first predetermined speed M1, the motor 42 is controlled at the first assist ratio A1 so that the output of the motor 42 is limited. Accordingly, the rider can easily change the posture in a preferred manner by quickly operating the adjustable seatpost 50 in a state in which the output of the motor 42 is limited and the behavior of the human-powered vehicle 10 is stable.

Ninth Embodiment

Figure 12:
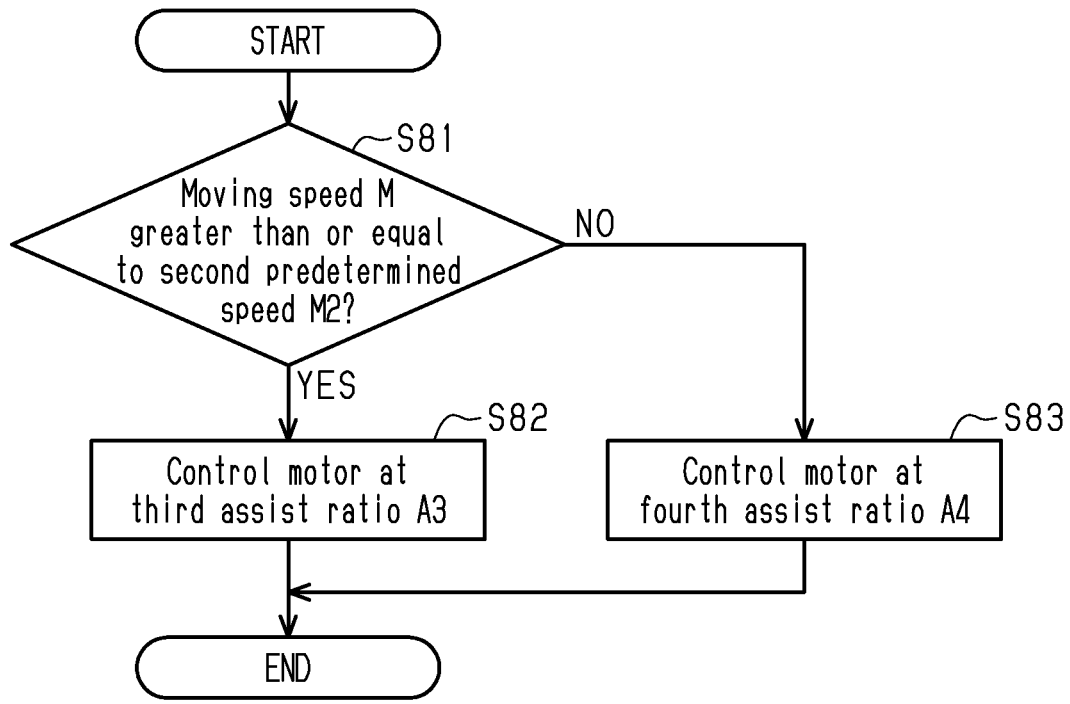
FIG. 12 is a flowchart illustrating a process for changing an assist rate executed by a controller in accordance with a ninth embodiment.

With reference to FIG. 12, the control device 60 in accordance with the ninth embodiment will now be described. The control device 60 in accordance with the ninth embodiment is the same as the control device 60 in accordance with the first and fifth embodiments except that the motor 42 is controlled in accordance with the extending or retracting action of the movable member 48. Thus, same reference numerals are given to those components that are the same as the corresponding components of the first and fifth embodiments. Such components will not be described in detail.

The movable member 48 of the present embodiment is the adjustable seatpost 50 that includes the outer member 52 and the inner member 54. In a case where the moving speed M of the inner member 54 relative to the outer member 52 is greater than or equal to a second predetermined speed M2, the controller 62 controls the motor 42 at a third assist ratio A3. In a case where the moving speed M of the inner member 54 relative to the outer member 52 is less than the second predetermined speed M2, the controller 62 controls the motor 42 at a fourth assist ratio A4. The third assist ratio A3 is greater than the fourth assist ratio A4.

With reference to FIG. 12, a process for changing the assist ratio A in accordance with the extending or retracting action of the movable member 48 will now be described. In a case where the electric power is supplied to the controller 62, the controller 62 starts the process and proceeds to step S81 of the flowchart shown in FIG. 12. In a case where the process illustrated by the flowchart in FIG. 12 ends, the controller 62 repeats the process from step S81 after a predetermined cycle until the supply of the electric power stops.

In step S81, the controller 62 determines whether the moving speed M is greater than or equal to the second predetermined speed M2. In a case where the moving speed M is greater than or equal to the second predetermined speed M2, the controller 62 proceeds to step S82. In step S82, the controller 62 controls the motor 42 at the third assist ratio A3 and then ends the process.

In step S81, in a case where the moving speed M is less than the second predetermined speed M2, the controller 62 proceeds to step S83. In step S83, the controller 62 controls the motor 42 at the fourth assist ratio A4 and then ends the process.

In a case where the moving speed M of the inner member 54 relative to the outer member 52 is greater than or equal to the second predetermined speed M2, the motor 42 is controlled at the third assist ratio A3 so that the output of the motor 42 easily increase. In this way, in a case where the rider quickly actuates the adjustable seatpost 50 to travel actively, the motor 42 can assist the human driving force H in a preferred manner.

Tenth Embodiment

Figure 13:
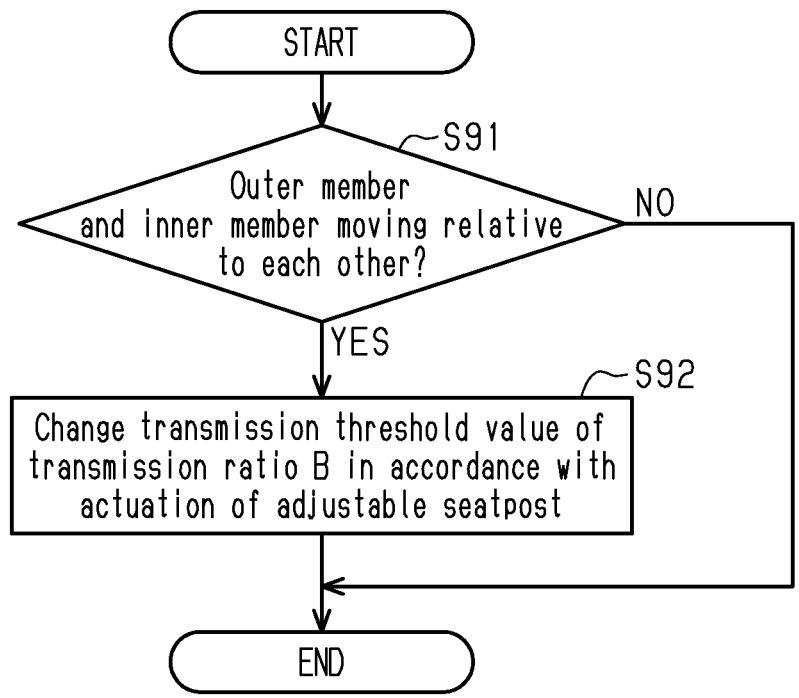
FIG. 13 is a flowchart illustrating a process for changing a transmission threshold value of a transmission ratio executed by a controller in accordance with a tenth embodiment.

With reference to FIG. 13, the control device 60 in accordance with the tenth embodiment will now be described. The control device 60 in accordance with the tenth embodiment is the same as the control device 60 in accordance with the first and fifth embodiments except that the transmission 46 is controlled in accordance with the extending or retracting action of the movable member 48. Thus, same reference numerals are given to those components that are the same as the corresponding components of the first and fifth embodiments. Such components will not be described in detail.

The human-powered vehicle 10 includes a wheel and the crank 14. The movable member 48 of the present embodiment is the adjustable seatpost 50. The controller 62 controls the transmission 46 that changes the transmission ratio B of the rotational speed N of the crank 14 to the rotational speed of the wheel in accordance with the traveling state of the human-powered vehicle 10. The controller 62 changes a transmission threshold value of the transmission ratio B in accordance with the actuation of the adjustable seatpost 50. As described below, the transmission threshold value indicates a maximum or minimum value of the transmission ratio B with respect to the human driving force H and the rotational speed N of the crank 14.

In one example, the traveling state of the human-powered vehicle 10 includes the human driving force H. In this case, for example, in a case where the human driving force H becomes greater than a first transmission threshold value H1, the controller 62 controls the transmission 46 to decrease the transmission ratio B. Further, in a case where the human driving force H becomes less than a second transmission threshold value H2, the controller 62 controls the transmission 46 to increase the transmission ratio B. The first transmission threshold value H1 is greater than the second transmission threshold value H2.

In another example, the traveling state of the human-powered vehicle 10 includes the rotational speed N of the crank 14. In this case, for example, the controller 62 controls the transmission 46 so that the transmission ratio B increases in a case where the rotational speed N of the crank 14 becomes greater than a first transmission threshold value N1. Further, the controller 62 controls the transmission 46 so that the transmission ratio B decreases in a case where the rotational speed N of the crank 14 becomes less than a second transmission threshold value N2.

The controller 62, for example, changes the transmission threshold value in accordance with the moving speed M of the inner member 54 relative to the outer member 52. For example, in a case where the moving speed M is greater than or equal to a first speed MY, the controller 62 increases the first transmission threshold values H1 and N1 more than in a case where the moving speed M is less than the first speed MY. For example, in a case where the moving speed M is less than the first speed MY, the controller 62 decreases the second transmission threshold values H2 and N2 to be smaller than those in a case where the moving speed M is greater than or equal to the first speed MY. In this case, changes in the transmission ratio B is limited in a case where the moving speed M greater than or equal to the first speed MY. Thus, the rider is less likely to experience awkward feelings.

The controller 62, for example, changes the transmission threshold value in accordance with the moving direction of the inner member 54 relative to the outer member 52. The controller 62, for example, increases the first transmission threshold values H1 and N1 in a case where the outer member 52 and the inner member 54 move in the direction away from each other. The controller 62, for example, decreases the second transmission threshold values H2 and N2 in a case where the outer member 52 and the inner member 54 move in a direction away from each other. In this case, changes in the transmission ratio B is limited in a case where the rider raises the height position of the saddle 20 to shift from standing pedaling to seated pedaling. Thus, the rider is less likely to experience awkward feelings.

The controller 62 can increase the first transmission threshold values H1 and N1 in a case where the outer member 52 and the inner member 54 move toward each other. The controller 62 can decrease the second transmission threshold values H2 and N2 in a case where the outer member 52 and the inner member 54 move toward each other. In this case, changes in the transmission ratio B is limited in a case where the rider raises the height position of the saddle 20 to shift from seated pedaling to standing pedaling. Thus, the rider is less likely to experience awkward feelings.

With reference to FIG. 13, a process for changing a transmission threshold value in accordance with the extending or retracting action of the movable member 48 will now be described. In a case where the electric power is supplied to the controller 62, the controller 62 starts the process and proceeds to step S91 of the flowchart shown in FIG. 13. In a case where the process illustrated by the flowchart in FIG. 13 ends, the controller 62 repeats the process from step S91 after a predetermined cycle until the supply of the electric power stops.

In step S91, the controller 62 determines whether the outer member 52 and the inner member 54 are moving relative to each other. In a case where the outer member 52 and the inner member 54 are not moving relative to each other, the controller 62 ends the process. In a case where the outer member 52 and the inner member 54 are moving relative to each other, the controller 62 proceeds to step S92. In step S92, the controller 62 changes the transmission threshold value of the transmission ratio B in accordance with the actuation of the adjustable seatpost 50.

Eleventh Embodiment

Figure 14:
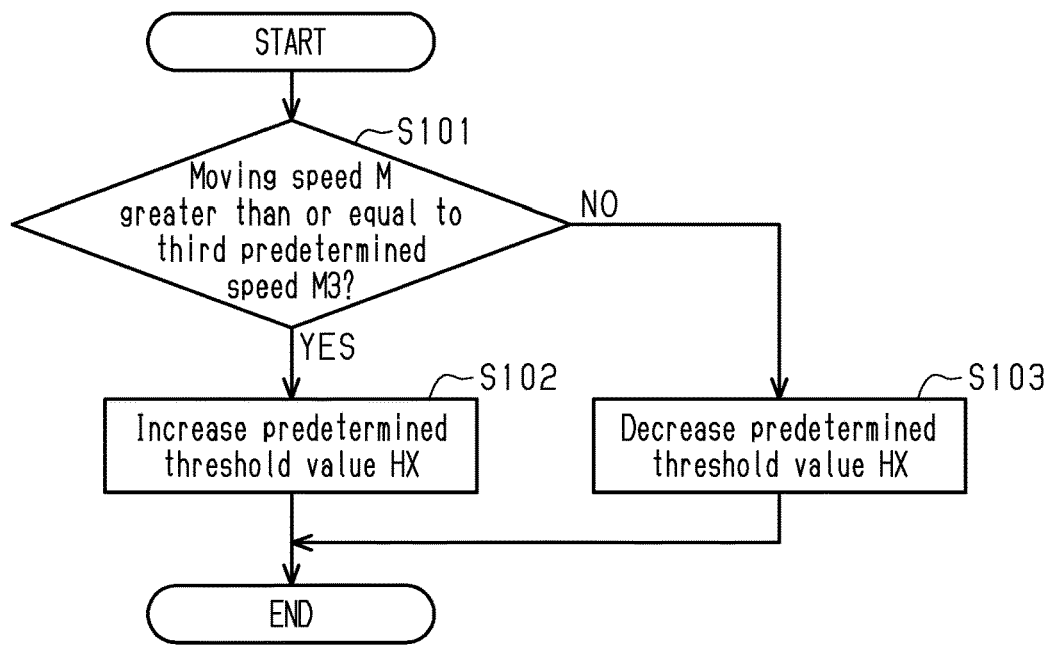
FIG. 14 is a flowchart illustrating a process for changing a predetermined threshold value executed by a controller in accordance with an eleventh embodiment.

With reference to FIG. 14, the control device 60 in accordance with the eleventh embodiment will now be described. The control device 60 in accordance with the eleventh embodiment is the same as the control device 60 in accordance with the first, third, and fifth embodiments except that the motor 42 is controlled in accordance with the extending or retracting action of the movable member 48. Thus, same reference numerals are given to those components that are the same as the corresponding components of the first, third, and fifth embodiments. Such components will not be described in detail.

The movable member 48 of the present embodiment is the adjustable seatpost 50 that includes the outer member 52 and the inner member 54. In a case where the human driving force H input to the human-powered vehicle 10 becomes equal to the predetermined threshold value HX, the controller 62 starts driving the motor 42. In a case where the moving speed M of the inner member 54 relative to the outer member 52 is greater than or equal to a third predetermined speed M3, the controller 62 increases the predetermined threshold value HX. In a case where the moving speed M of the inner member 54 relative to the outer member 52 is less than the third predetermined speed M3, the controller 62 decreases the predetermined threshold value HX.

With reference to FIG. 14, a process for changing the predetermined threshold value HX in accordance with the extending or retracting action of the movable member 48 will now be described. In a case where the electric power is supplied to the controller 62, the controller 62 starts the process and proceeds to step S101 of the flowchart shown in FIG. 14. In a case where the process illustrated by the flowchart in FIG. 14 ends, the controller 62 repeats the process from step S101 after a predetermined cycle until the supply of the electric power stops.

In step S101, the controller 62 determines whether the moving speed M is greater than or equal to the third predetermined speed M3. In a case where the moving speed M is greater than or equal to the third predetermined speed M3, the controller 62 proceeds to step S102. In step S102, the controller 62 increases the predetermined threshold value HX and then ends the process.

In step S101, in a case where the moving speed M is less than the third predetermined speed M3, the controller 62 proceeds to step S103. In step S103, the controller 62 decreases the predetermined threshold value HX and then ends the process.

Twelfth Embodiment

Figure 2:
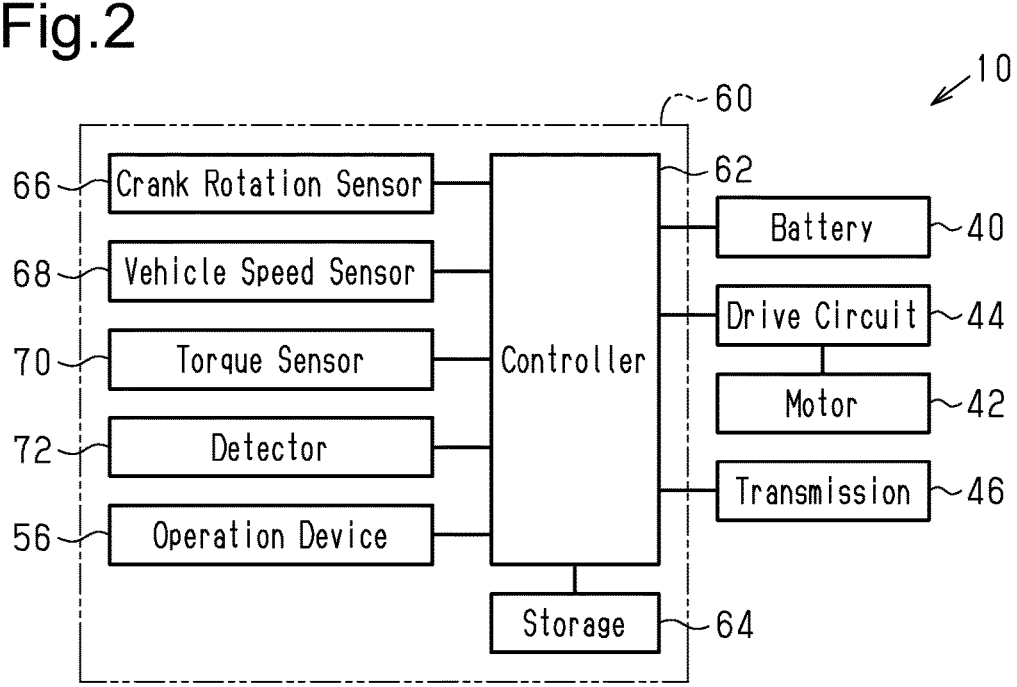
FIG. 2 is a block diagram showing the electric configuration of the human-powered vehicle control device in accordance with the first embodiment.
Figure 15:
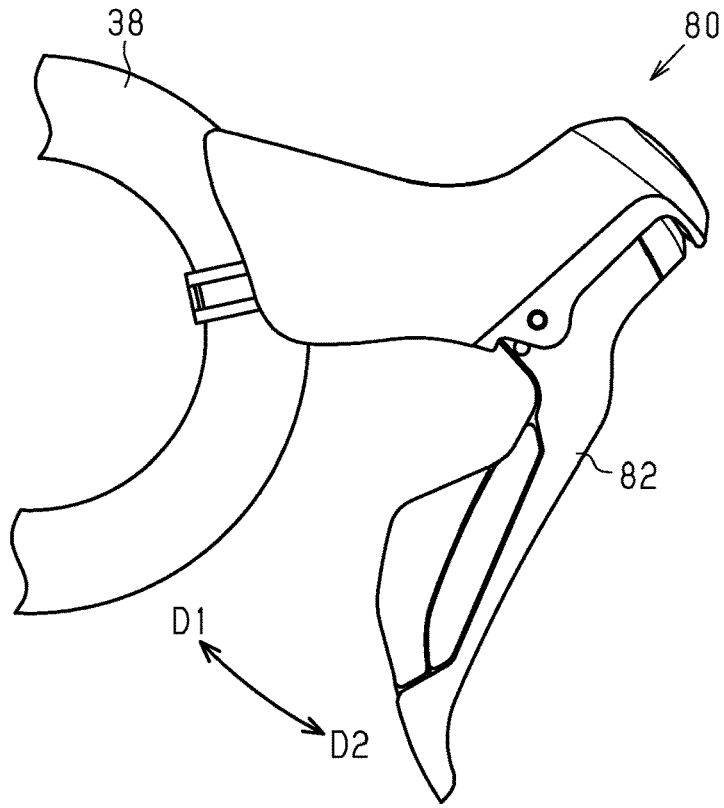
FIG. 15 is a side view of an operation device in accordance with a twelfth embodiment.
Figure 16:
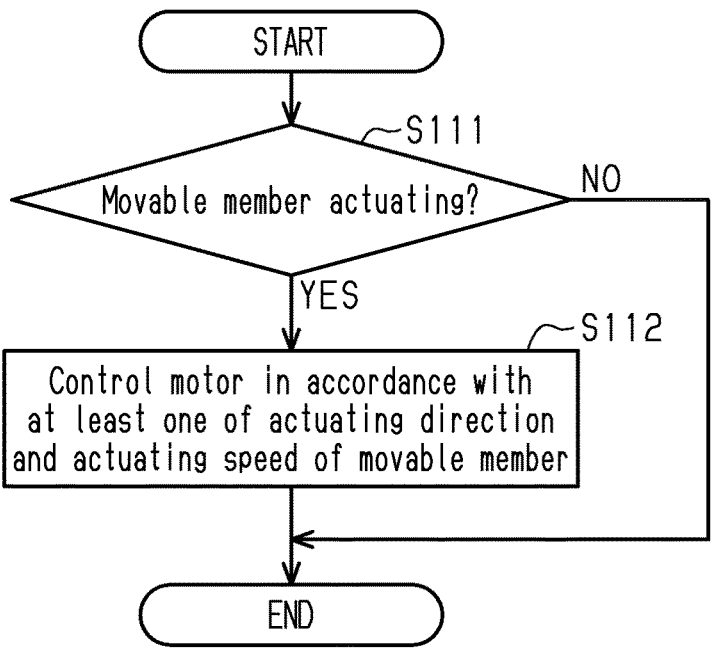
FIG. 16 is a flowchart illustrating a process for controlling a motor executed by a controller in accordance with a twelfth embodiment.

With reference to FIGS. 1, 15, and 16, the control device 60 in accordance with the twelfth embodiment will now be described. The control device 60 in accordance with the twelfth embodiment is the same as the first embodiment except that the motor 42 is controlled in accordance with the extending or retracting action of the movable member 48. Thus, same reference numerals are given to those components that are the same as the corresponding components of the first embodiment. Such components will not be described in detail.

The control device 60 includes the controller 62 configured to control the motor 42 that assists propulsion of the human-powered vehicle 10 having an operation device 80 including a movable member 82. The controller 62 controls the motor 42 in accordance with at least one of the actuating speed and the actuating direction of the movable member 82. The controller 62 changes at least one of the predetermined threshold value HX, the response speed R, and the assist ratio A in accordance with the actuating speed of and the actuating direction of the movable member 82. Specifically, the controller 62 changes at least one of the assist ratio A, the predetermined threshold value HX, and the response speed R through the same processes as the first to eleventh embodiments.

The operation device 80 includes at least one of a lever-type operation device and a grip-type operation device. If the operation device 80 is of a lever type, the movable member 82 can include a lever. If the operation device 80 is of a grip type, the movable member 82 can includes a grip. If the operation device 80 is connected to a mechanical cable, the movable member 82 can include a cable.

The operation device 80, for example, includes at least one of an operation device of the transmission 46, the operation device 56 of the adjustable seatpost 50, and an operation device of a brake. The operation device 80 does not include an operation device for changing the control mode of the motor 42.

In a case where the operation device 80 includes the operation device of the transmission 46, the operation device 80 can include the transmission 46. In this case, the movable member 82 includes a movable portion of the transmission 46. In a case where the transmission 46 includes a derailleur, the movable portion of the transmission 46 includes at least one of a link of the derailleur, a movable member, and a plate. In a case where the transmission 46 includes an internal shifting device, the movable portion of the transmission 46 includes a control member that changes the rotational state of the gears of a planetary gear mechanism.

FIG. 15 shows one example of the operation device for the transmission 46 of the operation device 80. The movable member 82 includes a lever. The movable member 82 is configured to be movable in a first direction D1 and a second direction D2.

With reference to FIG. 16, a process for controlling the motor 42 in accordance with the actuation of the movable member 48 will now be described. In a case where the electric power is supplied to the controller 62, the controller 62 starts the process and proceeds to step S111 of the flowchart shown in FIG. 16. In a case where the process illustrated by the flowchart in FIG. 16 ends, the controller 62 repeats the process from step S111 after a predetermined cycle until the supply of the electric power stops.

In step S111, the controller 62 determines whether the movable member 82 is moving. In a case where there the movable member 82 is moving, the controller 62 proceeds to step S112. In step S112, the controller 62 controls the motor 42 in accordance with at least one of the actuating direction of the actuating speed of the movable member 82 and then ends the process. In step S111, in a case where the controller 62 determines that the movable member 82 is not moving, the controller 62 ends the process.

In a case where the operation device 80 includes a lever and controls the motor 42 in accordance with at least one of the operating direction and the actuating speed of the lever, the control of the motor 42 can be ended after a predetermined period elapses from the completion of the actuation of the movable member 48. In this case, for example, if the actuation of the transmission 46, the adjustable seatpost 50, or a brake, which are driven in correspondence with the actuation of the movable member 82, ends after the actuation of the movable member 82 has ended, a situation is avoided in which the control of the motor 42 ends before the actuation of the components end. The controller 62 can determine whether the predetermined period elapsed in accordance with at least one of time, the distance the human-powered vehicle 10 traveled, the rotational amount of the crank 14 or the first rotary body 26, the rotational amount of the second rotary body 28, and the rotational amount of the driving wheel 12B.

Thirteenth Embodiment

Figure 17:
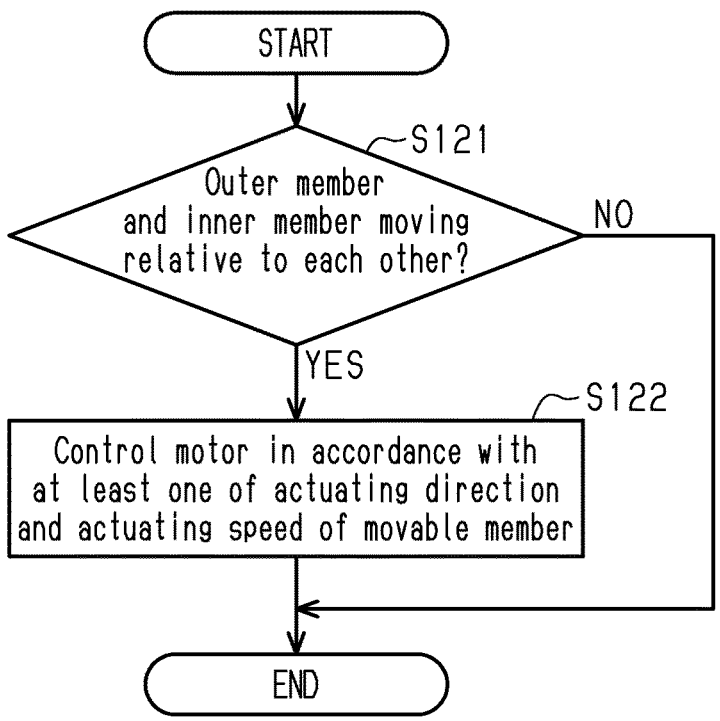
FIG. 17 is a flowchart illustrating a process for controlling a motor executed by a controller in accordance with a thirteenth embodiment.

With reference to FIGS. 1 and 17, the control device 60 in accordance with the thirteenth embodiment will now be described. The control device 60 in accordance with the thirteenth embodiment is the same as the first embodiment except that the motor 42 is controlled in accordance with the extending or retracting action of the movable member 48. Thus, same reference numerals are given to those components that are the same as the corresponding components of the first embodiment. Such components will not be described in detail.

The movable member 48 of the present embodiment is a suspension 90 that includes an outer member 92 and an inner member 94. The suspension 90 includes at least one of a front suspension and a rear suspension.

The control device 60 includes the controller 62 configured to control the motor 42 that assists propulsion of the human-powered vehicle 10 including the movable member 48 that is extensible and retractable. The controller 62 controls the motor 42 in accordance with the actuation of the movable member 48 during the extending or retracting action. The controller 62 preferably controls the motor 42 in accordance with at least one of the actuating direction and the actuating speed of the movable member 48.

In a first example, the controller 62 differentiates the control of the motor 42 between a case where the suspension 90 is actuated to move the outer member 92 and the inner member 94 way from each other and a case where the suspension 90 is actuated to move the outer member 92 and the inner member 94 toward each other. The controller 62 differentiates at least one of the assist ratio A, the predetermined threshold value HX, and the response speed R between a case where the suspension 90 is actuated to move the outer member 92 and the inner member 94 away from each other and a case where the suspension 90 is actuated to move the outer member 92 and the inner member 94 toward each other.

In a second example, the controller 62 changes the control of the motor 42 in accordance with the actuating speed of the inner member 94 relative to the outer member 92. The controller 62 changes at least one of the assist ratio A, the predetermined threshold value HX, and the response speed R in accordance with the actuating speed of the inner member 94 relative to the outer member 92. The first example and the second example can be combined.

With reference to FIG. 17, a process for controlling the motor 42 in accordance with the actuation of the movable member 48 will now be described. In a case where the electric power is supplied to the controller 62, the controller 62 starts the process and proceeds to step S121 of the flowchart shown in FIG. 17. In a case where the process illustrated by the flowchart in FIG. 17 ends, the controller 62 repeats the process from step S121 after a predetermined cycle until the supply of the electric power stops.

In step S121, the controller 62 determines whether the outer member 92 and the inner member 94 are moving relative to each other. In a case where the outer member 92 and the inner member 94 are moving relative to each other, the controller 62 proceeds to step S122. In step S122, the controller 62 controls the motor 42 in accordance with at least one of the actuating direction of the actuating speed of the movable member 48 and then ends the process. The controller 62 specifically controls the motor 42 in accordance with at least one of the actuating speed and the actuating direction of the relative movement of the outer member 92 and the inner member 94. In step S121, in a case where the outer member 92 and the inner member 94 are not moving relative to each other, the controller 62 ends the process.

Fourteenth Embodiment

Figure 18:
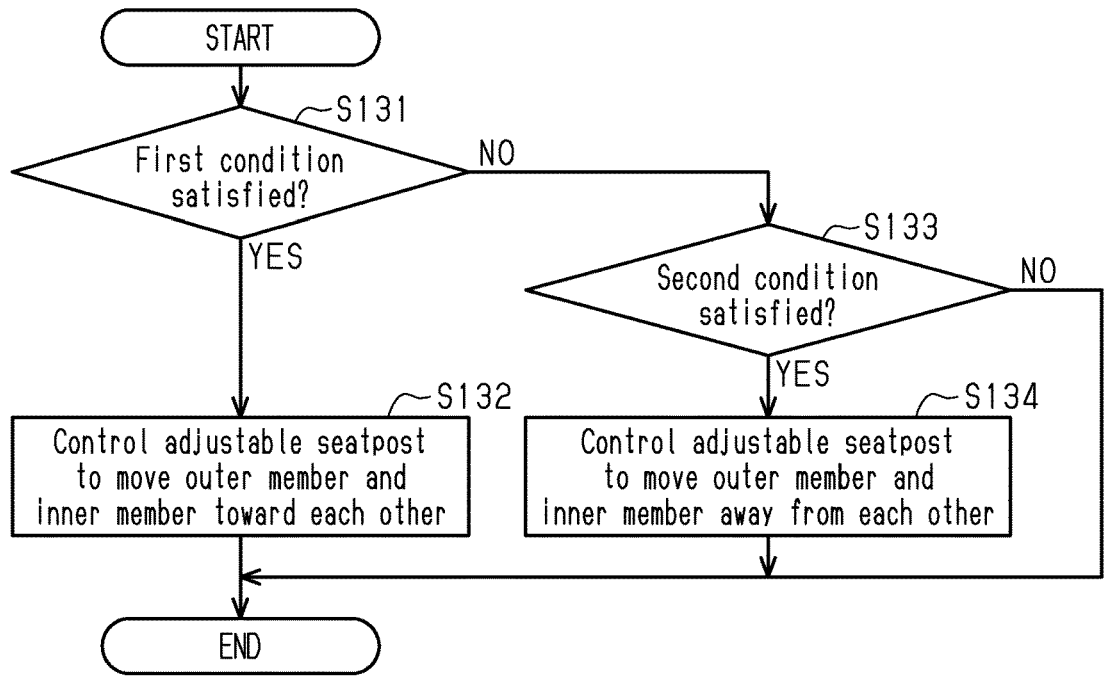
FIG. 18 is a flowchart illustrating a process for controlling an adjustable seatpost executed by a controller in accordance with a fourteenth embodiment.

With reference to FIG. 18, the control device 60 of the fourteenth embodiment will now be described. The control device 60 in accordance with the fourteenth embodiment is the same as that of the first embodiment except that the controller 62 controls the adjustable seatpost 50. Thus, same reference numerals are given to those components that are the same as the corresponding components of the first embodiment. Such components will not be described in detail.

As shown in FIG. 1, the adjustable seatpost 50 includes the electric actuator 50B that move the outer member 52 and the inner member 54 relative to each other. The electric actuator 50B includes an electric motor. In a case where a first condition is satisfied, the controller 62 actuates the adjustable seatpost 50 to move the outer member 52 and the inner member 54 toward each other. In a case where a second condition is satisfied, the controller 62 actuates the adjustable seatpost 50 to move the outer member 52 and the inner member 54 away from each other.

The first condition, for example, includes a case where a pitch angle of the human-powered vehicle 10 becomes less than a first angle. The second condition, for example, includes a case where the pitch angle of the human-powered vehicle 10 becomes greater than or equal to a second angle. The first angle corresponding to a pitch angle in a case where the human-powered vehicle 10 travels downhill. The second angle corresponds to a pitch angle in a case where the human-powered vehicle 10 travels uphill.

Figure 19:
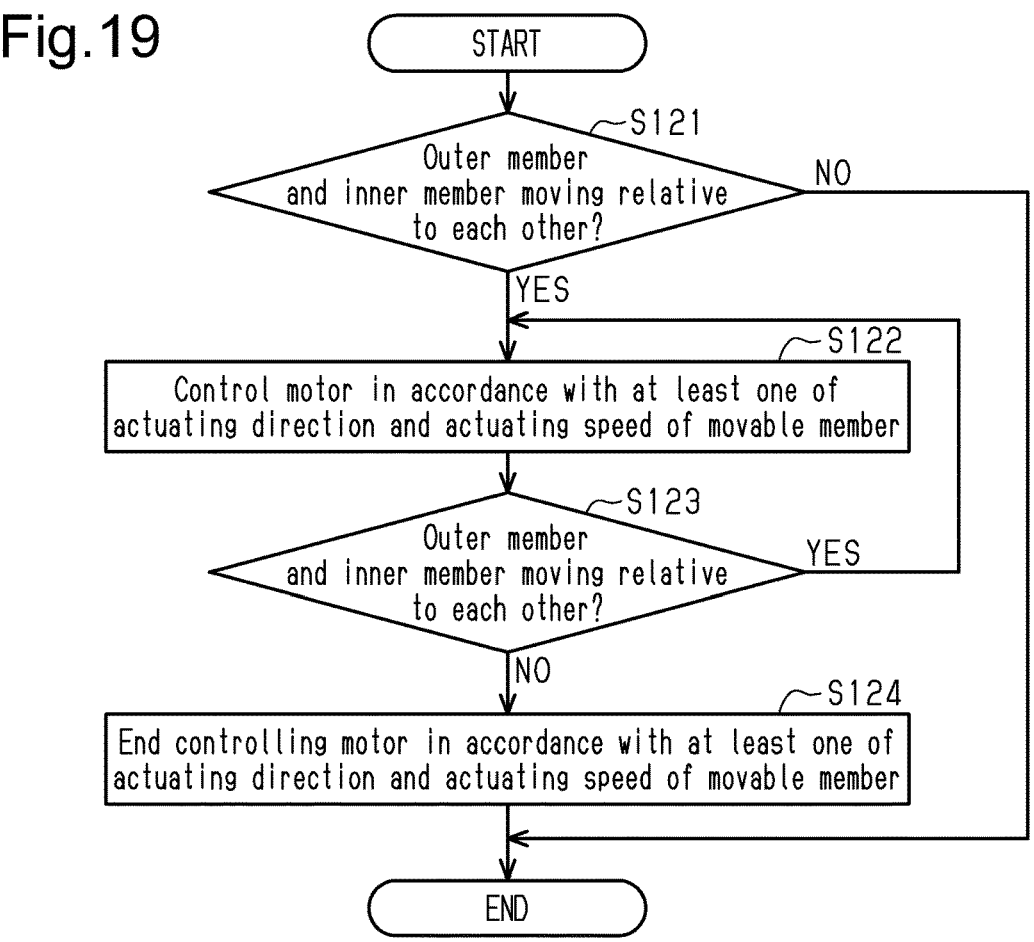
FIG. 19 is a flowchart illustrating a process for controlling a motor executed by the controller in accordance with the thirteenth embodiment.

With reference to FIG. 18, a process for controlling the adjustable seatpost 50 will now be described. In a case where the electric power is supplied to the controller 62, the controller 62 starts the process and proceeds to step S131 of the flowchart shown in FIG. 19. In a case where the process illustrated by the flowchart in FIG. 19 ends, the controller 62 repeats the process from step S131 after a predetermined cycle until the supply of the electric power stops.

In step S131, the controller 62 determines whether the first condition has been satisfied. In a case where the first condition has been satisfied, the controller 62 proceeds to step S132. In step S132, the controller 62 controls the adjustable seatpost 50 so that the outer member 52 and the inner member 54 move toward each other and then ends the process.

In step S131, in a case where the first condition has not been satisfied, the controller 62 proceeds to step S133. In step S133, the controller 62 determines whether the second condition has been satisfied. In a case where the second condition has not been satisfied, the controller 62 ends the process. In a case where the second condition has been satisfied, the controller 62 proceeds to step S134. In step S134, the controller 62 controls the adjustable seatpost 50 so that the outer member 52 and the inner member 54 move away from each other and then ends the process.

In the present embodiment, the controller 62 can determine the extending or retracting action of the movable member 48 in accordance with at least one of the control signal for actuating the adjustable seatpost 50 to move the outer member 52 and the inner member 54 toward each other and the control signal for actuating the adjustable seatpost 50 to move the outer member 52 and the inner member 54 away from each other and satisfaction of the first condition and the second condition. The controller 62 can be configured to change the actuating speed. The controller 62 can determine the moving speed M in accordance with at least one of the rotational speed and the control signal of the electric motor of the electric actuator 50B. The controller 62 changes at least one of the assist ratio A, the predetermined threshold value HX, and the response speed R in accordance with at least one of the determined actuating direction and the moving speed M of the movable member 48. Specifically, the controller 62 changes at least one of the assist ratio A, the predetermined threshold value HX, and the response speed R through the same processes as the first to twelfth embodiments.

Modified Examples

The description related with the above embodiments exemplifies, without any intention to limit, an applicable form of a human-powered vehicle control device according to the present disclosure. In addition to the embodiments described above, the human-powered vehicle control device according to the present disclosure is applicable to, for example, modified examples of the above embodiments that are described below and combinations of at least two of the modified examples that do not contradict each other. In the modified examples described hereafter, same reference numerals are given to those components that are the same as the corresponding components of the above embodiment. Such components will not be described in detail.

Steps S11 and S12 can be omitted from the flowchart in FIG. 3 of the first embodiment. In this case, the controller 62 starts the process and proceeds to step S13 in a case where the electric power is supplied to the controller 62.

Steps S31 and S32 can be omitted from the flowchart in FIG. 6 of the third embodiment. In this case, the controller 62 starts the process and proceeds to step S33 in a case where the electric power is supplied to the controller 62.

In the fifth embodiment, in a case where the moving speed M is less than the predetermined speed MX and greater than 0, the motor 42 can be controlled so that the response speed R becomes equal to a third response speed R3. It is preferred that the controller 62 sets the response speed R in a case where the human driving force H increases at the third response speed R3 to be lower than the response speed R in a case where the human driving force H increases at the second response speed R2 and higher than the response speed R in a case where the human driving force H increases at the first response speed R1. The controller 62 can set the response speed R in a case where the human driving force H decreases at the third response speed R3 to be equal to the response speed R in a case where the human driving force H increases at the first response speed R1 or the second response speed R2. Alternatively, the controller 62 can set the response speed R in a case where the human driving force H decreases at the third response speed R3 to be lower than the response speed R in a case where the human driving force H increases at the first response speed R1 and higher than the response speed R in a case where the human driving force H increases at the second response speed R2. In this case, for example, in a case where the process has started in FIG. 8, if the electric power is supplied to the controller 62, the controller 62 determines whether the outer member 52 and the inner member 54 are moving relative to each other. In a case where the outer member 52 and the inner member 54 are moving relative to each other, the controller 62 proceeds to step S41. In a case where the outer member 52 and the inner member 54 are not moving relative to each other, the controller 62 ends the process. In a case where NO is determined in step S41, the controller 62 determines whether the moving speed M is less than the predetermined speed MX and greater than 0. In a case where the moving speed M is less than the predetermined speed MX and greater than 0, the controller 62 proceeds to step S43. In a case where the moving speed M is less than the predetermined speed MX and greater than 0, the controller 62 controls the motor 42 so that the response speed R becomes equal to the third response speed R3 and then ends the process.

In the eighth embodiment, in a case where the moving speed M is less than the first predetermined speed M1 and greater than 0, the motor 42 can be controlled at a fifth assist ratio A5. The fifth assist ratio A5 is preferably less than the second assist ratio A2 and greater than the first assist ratio A1. In this case, for example, in a case where the process has started in FIG. 11, if the electric power is supplied to the controller 62, the controller 62 determines whether the outer member 52 and the inner member 54 are moving relative to each other. In a case where, the outer member 52 and the inner member 54 are moving relative to each other, the controller 62 proceeds to step S71. In a case where the outer member 52 and the inner member 54 are not moving relative to each other, the controller 62 ends the process. In a case where No is determined in step S71, the controller 62 determines whether the moving speed M is less than the first predetermined speed M1 and greater than 0. In a case where the moving speed M is less than the first predetermined speed M1 and not greater than 0, the controller 62 proceeds to step S73. In a case where the moving speed M is less than the first predetermined speed M1 and greater than 0, the controller 62 controls the motor 42 at the fifth assist ratio A5 and then ends the process.

In the ninth embodiment, in a case where the moving speed M is less than the second predetermined speed M2 and greater than 0, the motor 42 can be controlled at a sixth assist ratio A6. The sixth assist ratio A6 is preferably greater than the fourth assist ratio A4 and less than the third assist ratio A3. In this case, for example, in a case where the process has started in FIG. 12, if the electric power is supplied to the controller 62, the controller 62 determines whether the outer member 52 and the inner member 54 are moving relative to each other. In a case where, the outer member 52 and the inner member 54 are moving relative to each other, the controller 62 proceeds to step S81. In a case where the outer member 52 and the inner member 54 are not moving relative to each other, the controller 62 ends the process. In a case where No is determined in step S81, the controller 62 determines whether the moving speed M is less than the second predetermined speed M2 and greater than 0. In a case where the moving speed M is less than the second predetermined speed M2 and not greater than 0, the controller 62 proceeds to step S83. In a case where the moving speed M is less than the second predetermined speed M2 and greater than 0, the controller 62 controls the motor 42 at the sixth assist ratio A6 and then ends the process.

In the eleventh embodiment, in a case where the moving speed M is less than the third predetermined speed M3 and greater than 0, the predetermined threshold value HX can be increased. In this case, it is preferred that the predetermined threshold value HX in a case where the moving speed M is less than the third predetermined speed M3 and greater than 0 be greater than the predetermined threshold value HX in a case where the moving speed M is greater than or equal to the third predetermined speed M3. In this case, for example, in a case where the process has started in FIG. 14, if the electric power is supplied to the controller 62, the controller 62 determines whether the outer member 52 and the inner member 54 are moving relative to each other. In a case where, the outer member 52 and the inner member 54 are moving relative to each other, the controller 62 proceeds to step S101. In a case where the outer member 52 and the inner member 54 are not moving relative to each other, the controller 62 ends the process. In a case where NO is determined in step S101, the controller 62 determines whether the moving speed M is less than the third predetermined speed M3 and greater than 0. In a case where the moving speed M is less than the third predetermined speed M3 and not greater than 0, the controller 62 proceeds to step S103. In a case where the moving speed M is less than the third predetermined speed M3 and greater than 0, the controller 62 increases the predetermined threshold value HX and then ends the process.

In the eleventh embodiment, in a case where the moving speed M of the inner member 54 relative to the outer member 52 is greater than or equal to the third predetermined speed M3, the controller 62 can set the predetermined threshold value HX to a first predetermined threshold value HX1. In a case where the moving speed M of the inner member 54 relative to the outer member 52 is less than the third predetermined speed M3, the controller can set the predetermined threshold value HX to a second predetermined threshold value HX2. The first predetermined threshold value HX1 is greater than the second predetermined threshold value HX2.

In the processes for changing at least one of the assist ratio A, the predetermined threshold value HX, and the response speed R of the first to twelfth embodiments, at least two of the processes that do not contradict each other can be combined.

In the first to fourteenth embodiments, the controller 62 can determine whether the actuation of the movable members 48 and 82 are continuing. In a case where the actuation of the movable members 48 and 82 are continuing, the controller 62 can control the motor 42 in accordance with at least one of the actuating direction and the actuating speed of the movable members 48 and 82. For example, the flowchart in FIG. 17 of the thirteenth embodiment can be changed to the one in FIG. 19. After executing step S122, the controller 62 proceeds to step S123. In step S123, the controller 62 determines whether the outer member 92 and the inner member 94 are moving relative to each other. In a case where the controller 62 determined that the outer member 92 and the inner member 94 are moving relative to each other, the controller 62 executes step S122 again. Specifically, in a case where the controller 62 has determined that the outer member 92 and the inner member 94 are moving relative to each other in step S121 or the preceding step S123 and then the outer member 92 and the inner member 94 further moved relative to each other, the controller 62 determines that the outer member 92 and the inner member 94 are moving relative to each other. In step S123, in a case where the controller 62 determines that the outer member 92 and the inner member 94 are not moving relative to each other, the controller 62 proceeds to step S124. In step S124, the controller 62 ends controlling the motor 42 in accordance with at least one of the actuating direction and the actuating speed of the movable member 48 and then ends the process. For example, in a case where the controller 62 has changed the assist ratio A, the predetermined threshold value HX, and the response speed R in step S122, the controller 62 can change the assist ratio A, the predetermined threshold value HX, and the response speed R back to those before step S122 in step S124. Each time the controller executes step S122, the controller 62 can change to the control of the motor 42 in accordance with at least one of the immediately previous moving direction and the actuating speed of the movable member 48.

The following technical concepts can be included in the thirteenth embodiment.

The movable member 48 is a front suspension that includes the outer member 92 and the inner member 94, and in a case where the front suspension is actuated to move the outer member 92 and the inner member 94 away from each other, the controller 62 decreases the assist ratio A of the motor 42.

In a case where the front suspension is actuated to move the outer member 92 and the inner member 94 toward each other, the controller 62 increases the assist ratio A of the motor 42.

The movable member 48 is a front suspension that includes the outer member 92 and the inner member 94, and in a case where the front suspension is actuated to move the outer member 92 and the inner member 94 toward each other, the controller 62 increases the assist ratio A of the motor 42.

The movable member 48 is a rear suspension that includes the outer member 92 and the inner member 94, and in a case where the rear suspension is actuated to move the outer member 92 and the inner member 94 away from each other, the controller 62 increases the assist ratio A of the motor 42.

The movable member 48 is a rear suspension that includes the outer member 92 and the inner member 94, and in a case where the rear suspension is actuated to move the outer member 92 and the inner member 94 toward each other, the controller 62 decreases the assist ratio A of the motor 42.

The movable member 48 is a front suspension that include the outer member 92 and the inner member 94, and in a case where the movement amount of the inner member 94 relative to the outer member 92 is greater than or equal to a predetermined value and the moving speed M of the inner member 94 relative to the outer member 92 is greater than or equal to a predetermined speed MA, the controller 62 decreases the assist ratio A of the motor 42.

The movable member 48 is a rear suspension that include the outer member 92 and the inner member 94, and in a case where the movement amount of the inner member 94 relative to the outer member 92 is greater than or equal to a predetermined value and the moving speed M of the inner member 94 relative to the outer member 92 is greater than or equal to a predetermined speed MA, the controller 62 decreases the assist ratio A of the motor 42.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

DESCRIPTION OF REFERENCE CHARACTERS 10) human-powered vehicle, 14) crank, 12) wheel, 42) motor, 46) transmission, 48) movable member, 50) adjustable seatpost, 52) outer member, 54) inner member, 60) human-powered vehicle control device, 62) controller, 80) operation device, 82) movable member, 90) suspension, 92) outer member, 94) inner member

The invention claimed is:

1. A human-powered vehicle control device, comprising:
a controller configured to control a motor that assists propulsion of a human-powered vehicle including a movable member that is extensible and retractable, wherein
the controller controls the motor in accordance with actuation of the movable member during an extending or retracting action of the movable member,
the human-powered vehicle includes a wheel and a crank,
the movable member is an adjustable seatpost,
the controller controls a transmission that changes a transmission ratio of a rotational speed of the crank to a rotational speed of the wheel in accordance with a traveling state of the human-powered vehicle, and
the controller changes a transmission threshold value of the transmission ratio in accordance with the actuation of the adjustable seatpost.

2. The human-powered vehicle control device according to claim 1, wherein the controller is further configured to control the motor in accordance with an actuating direction of the movable member.

3. The human-powered vehicle control device according to claim 2, wherein
the movable member includes an outer member and an inner member, and
the controller increases an assist ratio of the motor to human driving force input to the human-powered vehicle in a case where the adjustable seatpost is actuated to move the outer member and the inner member away from each other.

4. The human-powered vehicle control device according to claim 3, wherein the controller decreases the assist ratio of the motor in a case where the adjustable seatpost is actuated to move the outer member and the inner member toward each other.

5. The human-powered vehicle control device according to claim 2, wherein
the movable member includes an outer member and an inner member, and
the controller decreases an assist ratio of the motor to human driving force input to the human-powered vehicle in a case where the adjustable seatpost is actuated to move the outer member and the inner member toward each other.

6. A human-powered vehicle control device, comprising:
a controller configured to control a motor that assists propulsion of a human-powered vehicle including a movable member that is extensible and retractable, wherein
the controller controls the motor in accordance with actuation of the movable member during an extending or retracting action of the movable member,
the movable member is an adjustable seatpost that includes an outer member and an inner member,
the controller starts driving the motor in a case where human driving force input to the human-powered vehicle becomes equal to a predetermined threshold value, and
the controller decreases the predetermined threshold value in a case where the adjustable seatpost is actuated to move the outer member and the inner member away from each other.

7. The human-powered vehicle control device according to claim 6, wherein the controller increases the predetermined threshold value in a case where the adjustable seatpost is actuated to move the outer member and the inner member toward each other.

8. A human-powered vehicle control device, comprising:
a controller configured to control a motor that assists propulsion of a human-powered vehicle including a movable member that is extensible and retractable, wherein
the controller controls the motor in accordance with actuation of the movable member during an extending or retracting action of the movable member,
the movable member is an adjustable seatpost that includes an outer member and an inner member,
the controller starts driving the motor in a case where human driving force input to the human-powered vehicle becomes equal to a predetermined threshold value, and the controller increases the predetermined threshold value in a case where the adjustable seatpost is actuated to move the outer member and the inner member toward each other.

9. A human-powered vehicle control device, comprising:
a controller configured to control a motor that assists propulsion of a human-powered vehicle including a movable member that is extensible and retractable, wherein
the controller controls the motor in accordance with an actuating speed of the movable member during an extending or retracting action of the movable member,
the movable member is an adjustable seatpost that includes an outer member and an inner member,
the controller controls the motor so that a response speed of the motor becomes equal to a first response speed in a case where a moving speed of the inner member relative to the outer member is greater than or equal to a predetermined speed,
the controller controls the motor so that the response speed of the motor becomes equal to a second response speed in a case where the moving speed of the inner member relative to the outer member is less than the predetermined speed, and
the first response speed is lower than the second response speed.

10. The human-powered vehicle control device according to claim 1, wherein
the movable member includes an outer member and an inner member,
the controller changes an assist ratio of the motor to human driving force input to the human-powered vehicle in accordance with a moving direction of the inner member relative to the outer member, and
the controller changes a response speed of the motor in accordance with a moving speed of the inner member relative to the outer member.

11. A human-powered vehicle control device, comprising:
a controller configured to control a motor that assists propulsion of a human-powered vehicle including a movable member that is extensible and retractable, wherein
the controller controls the motor in accordance with an actuating speed of the movable member during an extending or retracting action of the movable member,
the movable member is an adjustable seatpost that includes an outer member and an inner member,
the controller starts driving the motor in a case where human driving force input to the human-powered vehicle becomes equal to a predetermined threshold value,
the controller changes the predetermined threshold value in accordance with a moving direction of the inner member relative to the outer member, and
the controller changes a response speed of the motor in accordance with a moving speed of the inner member relative to the outer member.

12. A human-powered vehicle control device, comprising:
a controller configured to control a motor that assists propulsion of a human-powered vehicle including a movable member that is extensible and retractable, wherein
the controller controls the motor in accordance with an actuating speed of the movable member during an extending or retracting action of the movable member,
the movable member is an adjustable seatpost that includes an outer member and an inner member,
the controller controls the motor at a first assist ratio in a case where a moving speed of the inner member relative to the outer member is greater than or equal to a first predetermined speed,
the controller controls the motor at a second assist ratio in a case where the moving speed of the inner member relative to the outer member is less than the first predetermined speed, and
the first assist ratio is lower than the second assist ratio.

13. A human-powered vehicle control device, comprising:
a controller configured to control a motor that assists propulsion of a human-powered vehicle including a movable member that is extensible and retractable, wherein
the controller controls the motor in accordance with an actuating speed of the movable member during an extending or retracting action of the movable member,
the movable member is an adjustable seatpost that includes an outer member and an inner member,
the controller controls the motor at a third assist ratio in a case where a moving speed of the inner member relative to the outer member is greater than or equal to a second predetermined speed,
the controller controls the motor at a fourth assist ratio in a case where the moving speed of the inner member relative to the outer member is less than the second predetermined speed, and
the third assist ratio is higher than the fourth assist ratio.

14. A human-powered vehicle control device, comprising:
a controller configured to control a motor that assists propulsion of a human-powered vehicle including a movable member that is extensible and retractable, wherein
the controller controls the motor in accordance with an actuating speed of the movable member during an extending or retracting action of the movable member,
the movable member is an adjustable seatpost that includes an outer member and an inner member,
the controller starts driving the motor in a case where human driving force input to the human-powered vehicle becomes equal to a predetermined threshold value, and
the controller increases the predetermined threshold value in a case where a moving speed of the inner member relative to the outer member is greater than or equal to a third predetermined speed.

15. The human-powered vehicle control device according to claim 14, wherein the controller decreases the predetermined threshold value in a case where the moving speed of the inner member relative to the outer member is less than the third predetermined speed.

16. A human-powered vehicle control device, comprising:
a controller configured to control a motor that assists propulsion of a human-powered vehicle having an operation device and a movable member, wherein
the controller is configured to control the motor in accordance with actuation of the movable member,
the human-powered vehicle includes a wheel and a crank,
the movable member is an adjustable seatpost,
the controller controls a transmission that changes a transmission ratio of a rotational speed of the crank to a rotational speed of the wheel in accordance with a traveling state of the human-powered vehicle, and
the controller changes a transmission threshold value of the transmission ratio in accordance with the actuation of the adjustable seatpost.

17. The human-powered vehicle control device according to claim 16, wherein the operation device includes at least one of a lever-type operation device and a grip-type operation device.

* * * * *